US012782926B2

(12) United States Patent
Itkis et al.

(10) Patent No.: US 12,782,926 B2
(45) Date of Patent: Nov. 3, 2026

(54) PROGNOSTICS ACCELERATION FOR MACHINE LEARNING ANOMALY DETECTION

(71) Applicant: ORACLE INTERNATIONAL CORPORATION, Redwood Shores, CA (US)

(72) Inventors: Dmitriy Itkis, Vancouver, WA (US); Matthew T. Gerdes, Oakland, CA (US); Kenny C. Gross, Escondido, CA (US); Guang Chao Wang, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 391 days.

(21) Appl. No.: 18/203,771

(22) Filed: May 31, 2023

(65) Prior Publication Data

US 2024/0402689 A1 Dec. 5, 2024

(51) Int. Cl.
*G05B 19/418* (2006.01)
*G06N 20/00* (2019.01)

(52) U.S. Cl.
CPC ....... *G05B 19/41875* (2013.01); *G06N 20/00* (2019.01); *G05B 2219/32368* (2013.01)

(58) Field of Classification Search
CPC .... G05B 19/41875; G05B 2219/32368; G06N 20/00

(Continued)

(56) References Cited

U.S. PATENT DOCUMENTS 4,686,655 A 8/1987 Hyatt
7,020,802 B2 3/2006 Gross et al.

(Continued)

FOREIGN PATENT DOCUMENTS

DE 4447288 A1 7/1995

OTHER PUBLICATIONS

Gross, Kenny, Oracle Labs; MSET2 Overview: "Anomaly Detection and Prediction" Oracle Cloud Autonomous Prognostics; p. 1-58; Aug. 8, 2019.

(Continued)

*Primary Examiner* — Md Azad
(74) *Attorney, Agent, or Firm* — Kraguljac Law Group LLC

(57) ABSTRACT

Systems, methods, and other embodiments associated with quadratic acceleration boost of compute performance for ML prognostics are described. In one embodiment, a prognostic acceleration method includes separating time series signals into a plurality of alternative configurations of clusters based on correlations between the time series signals. Machine learning models are trained for individual clusters in the alternative configurations of clusters. One or more of the alternative configurations of clusters is determined to be viable for use in a production environment based on whether the trained machine learning models for the individual clusters satisfy an accuracy threshold and a completion time threshold. Then, one configuration is selected from the alternative configurations of clusters that were determined to be viable configurations. Production machine learning models are deployed into the production environment to detect anomalies in the time series signals based on the selected configuration.

19 Claims, 5 Drawing Sheets

(58) Field of Classification Search
USPC .......................................................... 700/110
See application file for complete search history.

(56) References Cited

U.S. PATENT DOCUMENTS

| | | | |
|---|---|---|---|
| 7,191,096 | B1 | 3/2007 | Gross et al. |
| 7,281,112 | B1 | 10/2007 | Gross et al. |
| 7,292,659 | B1 | 11/2007 | Gross et al. |
| 7,391,835 | B1 | 6/2008 | Gross et al. |
| 7,542,995 | B2 | 6/2009 | Thampy et al. |
| 7,573,952 | B1 | 8/2009 | Thampy et al. |
| 7,613,576 | B2 | 11/2009 | Gross et al. |
| 7,613,580 | B2 | 11/2009 | Gross et al. |
| 7,702,485 | B2 | 4/2010 | Gross et al. |
| 7,869,977 | B2 | 1/2011 | Lewis et al. |
| 8,055,594 | B2 | 11/2011 | Dhanekula et al. |
| 8,069,490 | B2 | 11/2011 | Gross et al. |
| 8,150,655 | B2 | 4/2012 | Dhanekula et al. |
| 8,200,991 | B2 | 6/2012 | Vaidyanathan et al. |
| 8,214,682 | B2 | 7/2012 | Vaidyanathan et al. |
| 8,275,738 | B2 | 9/2012 | Gross et al. |
| 8,341,759 | B2 | 12/2012 | Gross et al. |
| 8,365,003 | B2 | 1/2013 | Gross et al. |
| 8,457,913 | B2 | 6/2013 | Zwinger et al. |
| 8,543,346 | B2 | 9/2013 | Gross et al. |
| 9,514,213 | B2 | 12/2016 | Wood et al. |
| 9,933,338 | B2 | 4/2018 | Noda et al. |
| 10,015,139 | B2 | 7/2018 | Gross et al. |
| 10,452,510 | B2 | 10/2019 | Gross et al. |
| 10,496,084 | B2 | 12/2019 | Li et al. |
| 10,860,011 | B2 | 12/2020 | Gross et al. |
| 10,929,776 | B2 | 2/2021 | Gross et al. |
| 11,042,428 | B2 | 6/2021 | Gross et al. |
| 11,055,396 | B2 | 7/2021 | Gross et al. |
| 11,255,894 | B2 | 2/2022 | Wetherbee et al. |
| 11,392,786 | B2 | 7/2022 | Gross et al. |
| 11,768,915 | B1 * | 9/2023 | Shama .................. G06N 20/00 707/737 |
| 2008/0140362 | A1 | 6/2008 | Gross et al. |
| 2008/0252309 | A1 | 10/2008 | Gross et al. |
| 2008/0252441 | A1 | 10/2008 | McElfresh et al. |
| 2008/0256398 | A1 | 10/2008 | Gross et al. |
| 2009/0099830 | A1 | 4/2009 | Gross et al. |
| 2009/0125467 | A1 | 5/2009 | Dhanekula et al. |
| 2009/0306920 | A1 | 12/2009 | Zwinger et al. |
| 2010/0023282 | A1 | 1/2010 | Lewis et al. |
| 2010/0033386 | A1 | 2/2010 | Lewis et al. |
| 2010/0161525 | A1 | 6/2010 | Gross et al. |
| 2010/0305892 | A1 | 12/2010 | Gross et al. |
| 2010/0306165 | A1 | 12/2010 | Gross et al. |
| 2012/0030775 | A1 | 2/2012 | Gross et al. |
| 2017/0163669 | A1 | 6/2017 | Brown et al. |
| 2018/0349797 | A1 | 12/2018 | Garvey et al. |
| 2019/0102718 | A1 | 4/2019 | Agrawal |
| 2019/0121714 | A1 * | 4/2019 | Gross ...................... G06F 21/55 |
| 2019/0163719 | A1 | 5/2019 | Gross et al. |
| 2019/0196892 | A1 | 6/2019 | Matei et al. |
| 2019/0197145 | A1 | 6/2019 | Gross et al. |
| 2019/0237997 | A1 | 8/2019 | Tsujii et al. |
| 2019/0243799 | A1 | 8/2019 | Gross et al. |
| 2019/0286725 | A1 | 9/2019 | Gawlick et al. |
| 2019/0324430 | A1 | 10/2019 | Herzog et al. |
| 2019/0378022 | A1 * | 12/2019 | Wang ...................... G06F 17/18 |
| 2020/0125819 | A1 | 4/2020 | Gross et al. |
| 2020/0144204 | A1 | 5/2020 | Keller, III et al. |
| 2020/0201950 | A1 | 6/2020 | Wang et al. |
| 2021/0081573 | A1 | 3/2021 | Gross et al. |
| 2021/0158202 | A1 | 5/2021 | Backlawski et al. |
| 2021/0174248 | A1 | 6/2021 | Wetherbee et al. |
| 2021/0270884 | A1 | 9/2021 | Wetherbee et al. |
| 2021/0344695 | A1 * | 11/2021 | Palani .................... G06N 3/043 |
| 2022/0121955 | A1 | 4/2022 | Chavoshi et al. |
| 2022/0237468 | A1 * | 7/2022 | Fang .................. H04L 63/1408 |
| 2024/0346389 | A1 * | 10/2024 | Pan ........................ G06N 3/045 |

OTHER PUBLICATIONS

Gross, K. C. et al., “Application of a Model-Based Fault Detection System to Nuclear Plant Signals,” downloaded from https://www.researchgate.net/publication/236463759; Conference Paper: May 1, 1997, 5 pages.

Bouali Fatma et al. “Visual mining of time series using a tubular visualization,” Visual Computer, Springer, Berlin, DE, vol. 32, No. 1, Dec. 5, 2014 (Dec. 5, 2014), pp. 15-30.

Dickey et al.; Checking for Autocorrelation in Regression Residuals; pp. 959-965; Proceedings of 11th Annual SAS Users Group International Conference; 1986.

Hoyer et al.; Spectral Decomposition and Reconstruction of Nuclear Plant Signals; pp. 1153-1158; published Jan. 1, 2005; downloaded on Jul. 14, 2021 from: https://support.sas.com/resources/papers/proceedings-archive/SUGI93/Sugi-93-193%20Hoyer%20Gross.pdf.

Whisnant et al.; “Proactive Fault Monitoring in Enterprise Servers,” IEEE—International Multiconference in Computer Science & Computer Engineering (Jun. 27-30, 2005) 11 pgs.

US Nuclear Regulatory Commission; “Technical Review of On-Line Monitoring Techniques for Performance Assessment,” vol. 1, Jan. 31, 2006.

Gribok, et al,. “Use of Kernel Based Techniques for Sensor Validation in Nuclear Power Plants,” International Topical Meeting on Nuclear Plant Instrumentation, Controls, and Human-Machine Interface Technologies (NPIC & HMIT 2000), Washington, DC, Nov. 2000, pp. 1-15.

Singer, et al., “Model-Based Nuclear Power Plant Monitoring and Fault Detection: Theoretical Foundations,” Intelligent System Application to Power Systems (ISAP ’97), Jul. 6-10, 1997, Seoul, Korea pp. 60-65.

Wald, A, “Sequential Probability Ratio Test for Reliability Demonstration”, John Wiley & Sons, 1947.

Abebe Diro et al.; A Comprehensive Study of Anomaly Detection Schemes in IoT Networks Using Machine Learning Algorithms; pp. 1-13; 2021; downloaded from: https://doi.org/10.3390/s21248320.

Zhenlong Xiao, et al.; Anomalous IoT Sensor Data Detection: An Efficient Approach Enabled by Nonlinear Frequency-Domain Graph Analysis; IEEE Internet of Things Journal, Aug. 2020; pp. 1-11.

Gross Kenny et al: “AI Decision Support Prognostics for IoT Asset Health Monitoring, Failure Prediction, Time to Failure”, 2019 International Conference on Computational Science and Computational Intelligence (CSCI), IEEE, Dec. 5, 2019, pp. 244-248.

* cited by examiner

PROGNOSTICS ACCELERATION FOR MACHINE LEARNING ANOMALY DETECTION

BACKGROUND

Sensors for a wide variety of physical phenomena may be affixed to machines, devices, systems, or facilities (collectively referred to as "assets"). The sensors gather readings of physical phenomena occurring in or around an asset. The readings collected by the sensors may be monitored or analyzed by computers in the cloud. Cloud computing is increasing in ubiquity at an exponential rate. Due to the increasing abundance of high-fidelity network-connected sensors, the capacity for the accumulation of data may nevertheless outpace processing power in the cloud.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
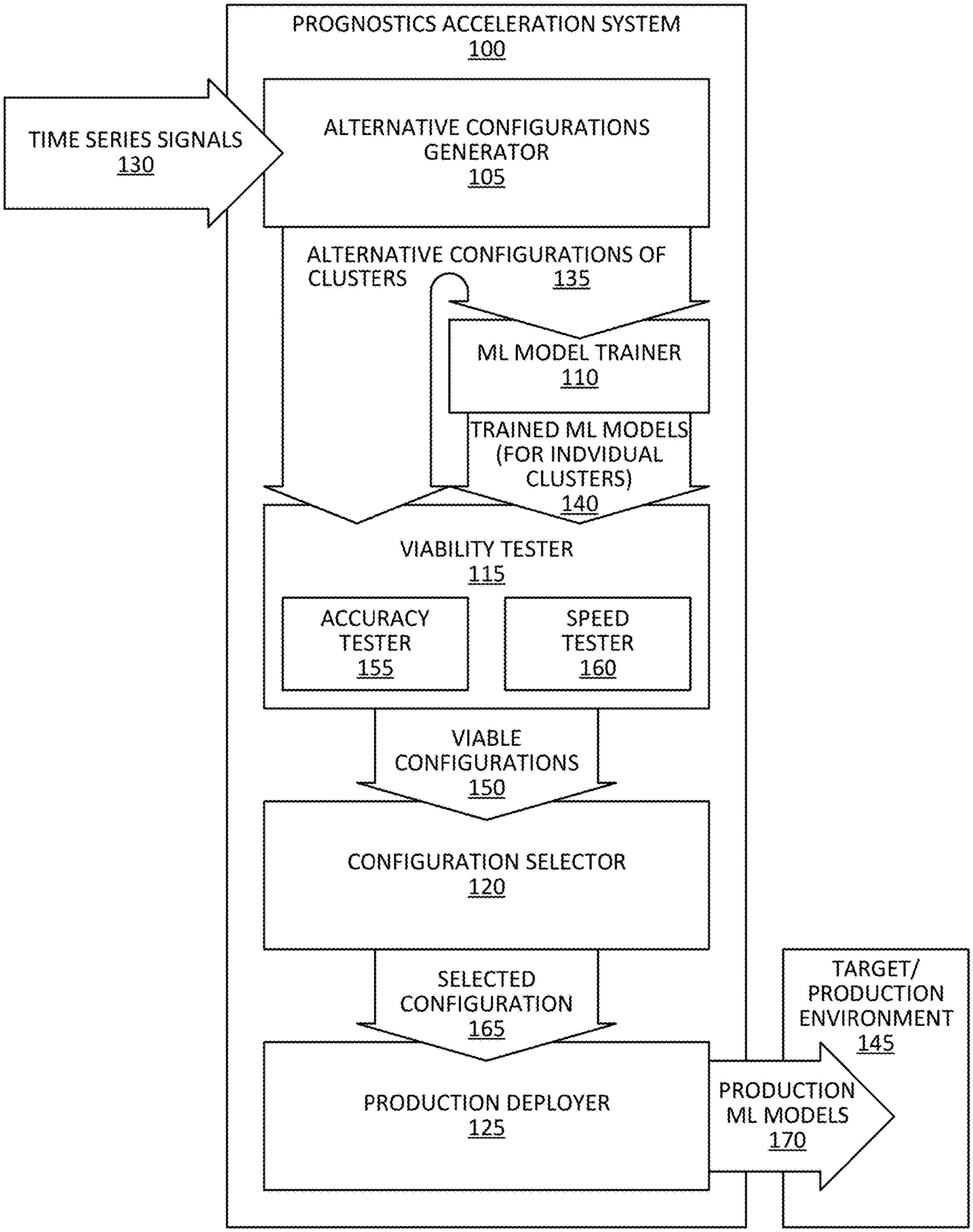
FIG. 1 illustrates one embodiment of a prognostics acceleration system associated with quadratic acceleration boost of compute performance for ML prognostics.

Systems, methods, and other embodiments are described herein that provide for quadratic acceleration boost of compute performance for big data machine learning (ML) prognostics. In one embodiment, a prognostics acceleration system automatically configures ML prognostic analyses to increase throughput and lower latency in a quadratic manner without diminishing model accuracy. In one embodiment, the ML prognostic analysis of a set of signals is broken down into ML prognostic analyses of subsets of the signals that are clustered based on correlation between signals. In one embodiment, the prognostics acceleration system automatically generates a configuration of clusters of the signals for prognostic analysis by individual ML models that satisfies user constraints for prognostic accuracy and completion time.

In one embodiment, the prognostics acceleration system partitions an overall set of signals into smaller subsets of signals that are monitored for anomalies by individual ML models. Partitioning in this manner improves the technology of ML prognostic analyses by quadratically reducing the cumulative compute time consumed by ML analyses in comparison with a single ML model for the entire set of signals, thus increasing throughput and reducing latency. For example, partitioning a number of signals N into 2 clusters $N_1$, $N_2$, reduces the compute cost from $(N_1+N_2)^2$ to $N_1^2+N_2^2$. And, such partitioning also improves the technology of ML prognostic analyses by enabling parallelization of the ML analyses of ML models.

Naïve or arbitrary partitioning of a signal set for increased throughput and decreased latency reduces the accuracy of ML prognostics because correlation of signals within the partitions is disregarded. In one embodiment, the prognostics acceleration system improves the technology of ML prognostic analyses by reducing or eliminating loss of ML model accuracy when partitioning a signal set for improved throughput and latency reduction by intelligently gathering correlated signals into clusters before partitioning. In one embodiment, the prognostics acceleration system improves the technology of ML prognostic analyses by automatically producing a configuration of clusters and ML models that meets or exceeds minimum standards for accuracy and speed in a specified production environment. In one embodiment, therefore, the prognostics acceleration system automatically determines how many clusters a collection of time series signals should be split into in order to meet accuracy and speed requirements. In one embodiment, the prognostics acceleration system improves the technology of ML prognostic analyses by reducing memory footprint for prognostic systems, increasing computational throughput to allow for real time prognostic prediction, and reducing latency of prognostic prediction, all with little to no loss in accuracy.

For example, where the set of time series signals are sensed from various components of a jet aircraft, the prognostics acceleration system automatically chooses how many clusters of correlated signals the set of time series signals should be broken down into in order to perform real-time prognostic analyses by available on-board computer hardware with user-specified accuracy.

Here, partitioning is based on correlation between signals in the cluster, rather than naïve or arbitrary partitioning. In one embodiment, the prognostics acceleration system further improves the technology of ML prognostic analyses by automatically producing a configuration of clusters and ML models that causes an increase in prognostic accuracy over using a single model for the unclustered time series signals.

Definitions

As used herein, the term "time series" refers to a data structure in which a series of data points or readings (such as observed or sampled values) are indexed in time order. In one embodiment, the data points of a time series may be indexed with an index such as a point in time described by a time stamp and/or an observation number. For example, a time series is one "column" or sequence of data points over multiple points in time from one of several sensors used to monitor an asset. As used herein, the terms "time series signal" and "time series" are synonymous. Occasionally, for convenience, a time series signal may be referred to simply as a "signal". For example, a time series is one "column" or sequence of observations over time from one of N variables (such as from one sensor of an aircraft).

As used herein, the term "vector" refers to a data structure that includes a set of data points or readings (such as observed or sampled values) from multiple time series at one particular point in time, such as a point in time described by a time stamp, observation number, or other index. For example, a "vector" is one row of data points sampled at one point in time from all sensors used to monitor an asset. A vector may also be referred to herein as an "observation". For example, a "vector" is one row of observations from all N variables (such as from all sensors of an aircraft).

As used herein, the term "time series database" refers to a data structure that includes multiple time series that share an index (such as a series of points in time, time stamps, time steps, or observation numbers) in common. Or, from another perspective, the term "time series database" refers to a data structure that includes vectors or observations across multiple time series at a series of points in time, that is, a time series of vectors. As an example, time series may be considered "columns" of a time series database, and vectors may be considered "rows" of a time series database. A time series database is thus one type of a set of time series readings. For example, a database or collection of sensed amplitudes from sensors of an aircraft may be arranged or indexed in order of a recorded time for the amplitudes, thus making a time series database of the sensed amplitudes.

As used herein, the term "residual" refers to a difference between a value (such as a measured, observed, sampled, or resampled value) and an estimate, reference, or prediction of what the value is expected to be. For example, a residual may be a difference between an actual, observed value and a machine learning (ML) prediction or ML estimate of what the value is expected to be by an ML model. In one embodiment, a time series of residuals or "residual time series" refers to a time series made up of residual values between a time series of values and a time series of what the values are expected to be.

As used herein, the term "clustering" refers to partitioning a set of time series signals into subsets, referred to as "clusters", that have a relatively high degree of intercorrelation between signals within the subset, and a relatively low degree of intercorrelation with signal outside of the subset (or within other subsets). More generally, signals in a cluster behave more similarly over time to other signals within the cluster than they do with signals outside of the clusters. The clusters can then be monitored for anomalous behavior using ML models that are specifically configured for the individual clusters. In one embodiment, clusters may be discrete, with no overlap or duplication of time series signals from one cluster to another. In another embodiment, clusters may overlap or include signals that are also present in other clusters. For example, multiple clusters may include a copy of a signal that represents a common influence on multiple devices represented by individual clusters of signals, such as ambient temperature, pressure, or humidity.

For example, an aircraft may have an engine, and a hydraulic pump. Time series signals from multiple sensors on the engine may be clustered into a subset of signals that represent correlated behaviors of the engine (e.g., rotation speed, vibration level, temperature, etc.), and time series signals from multiple sensors on the hydraulic pump may be clustered into a subset of signals that represent correlated behaviors of the hydraulic pump. The signals for the engine are more intercorrelated with each other, and less intercorrelated with the signals for the hydraulic pump, and the signals for the hydraulic pump are more intercorrelated with each other, and less intercorrelated with the signals for the engine.

It should be understood that no action or function described or claimed herein is performed by the human mind. No action or function described or claimed herein can be practically performed in the human mind. An interpretation that any action or function described or claimed herein can be performed in the human mind is inconsistent with and contrary to this disclosure.

Example Prognostics Acceleration System

FIG. 1 illustrates one embodiment of a prognostics acceleration system 100 associated with quadratic acceleration boost of compute performance for ML prognostics. Prognostics acceleration system 100 includes components for automatically generating a configuration of correlated signal clusters and ML models for anomaly detection that satisfies both compute speed and prognostic accuracy minimums in a given production environment. In one embodiment, the components of prognostics acceleration system 100 include alternative configurations generator 105, ML model trainer 110, viability tester 115, configuration selector 120, and production deployer 125.

In one embodiment, alternative configurations generator 105 is configured to separate time series signals 130 into a plurality of alternative configurations of clusters 135. In one embodiment, the alternative configurations of clusters 135 differ from each other by amount of individual clusters that the time series signals 130 are separated into for a given configuration. In one embodiment, ML model trainer 110 is configured to train machine learning models 140 for the individual clusters in the alternative configurations of clusters 135.

In one embodiment, viability tester 115 is configured to determine whether one or more of the alternative configurations of clusters 135 is viable for use in a target or production environment 145. Viable configurations 150 for use in the production environment 145 are determined based on whether the trained machine learning models 140 for the individual clusters in the one or more of the alternative configurations of clusters satisfy an accuracy threshold and a completion time threshold. In one embodiment, viability tester 115 includes an accuracy tester 155 that is configured to determine whether the trained machine learning models 140 satisfy the accuracy threshold by executing the trained machine learning models 140 and comparing accuracy levels of the trained machine learning models 140 against the accuracy threshold. In one embodiment, viability tester 115 includes a speed tester 160 that is configured to determine whether the trained machine learning models 140 satisfy the completion time threshold by simulating execution of the trained machine learning models 140 in the production environment 145 and comparing completion times of the trained machine learning models 140 against the completion time thresholds.

In one embodiment, configuration selector 120 is configured to select one configuration 165 from the alternative configurations of clusters that were determined to be viable configurations 150. In one embodiment, production deployer 125 is configured to deploy production machine learning models 170 into the production environment 145 to detect anomalies in the time series signals 130 based on the selected configuration 165.

In one embodiment, each of these components 105, 110, 115, 120, and 125 of prognostics acceleration system 100 may be implemented as software executed by computer hardware. For example, components 105, 110, 115, 120, and 125 may be implemented as one or more intercommunicating software modules, routines, or services for performing the functions of the components described herein.

Further details regarding prognostics acceleration system 100 are presented herein. In one embodiment, the operation of prognostics acceleration system 100 will be described with reference to example prognostics acceleration method 200 shown in FIG. 2.

Example Prognostics Acceleration Method

Figure 2:
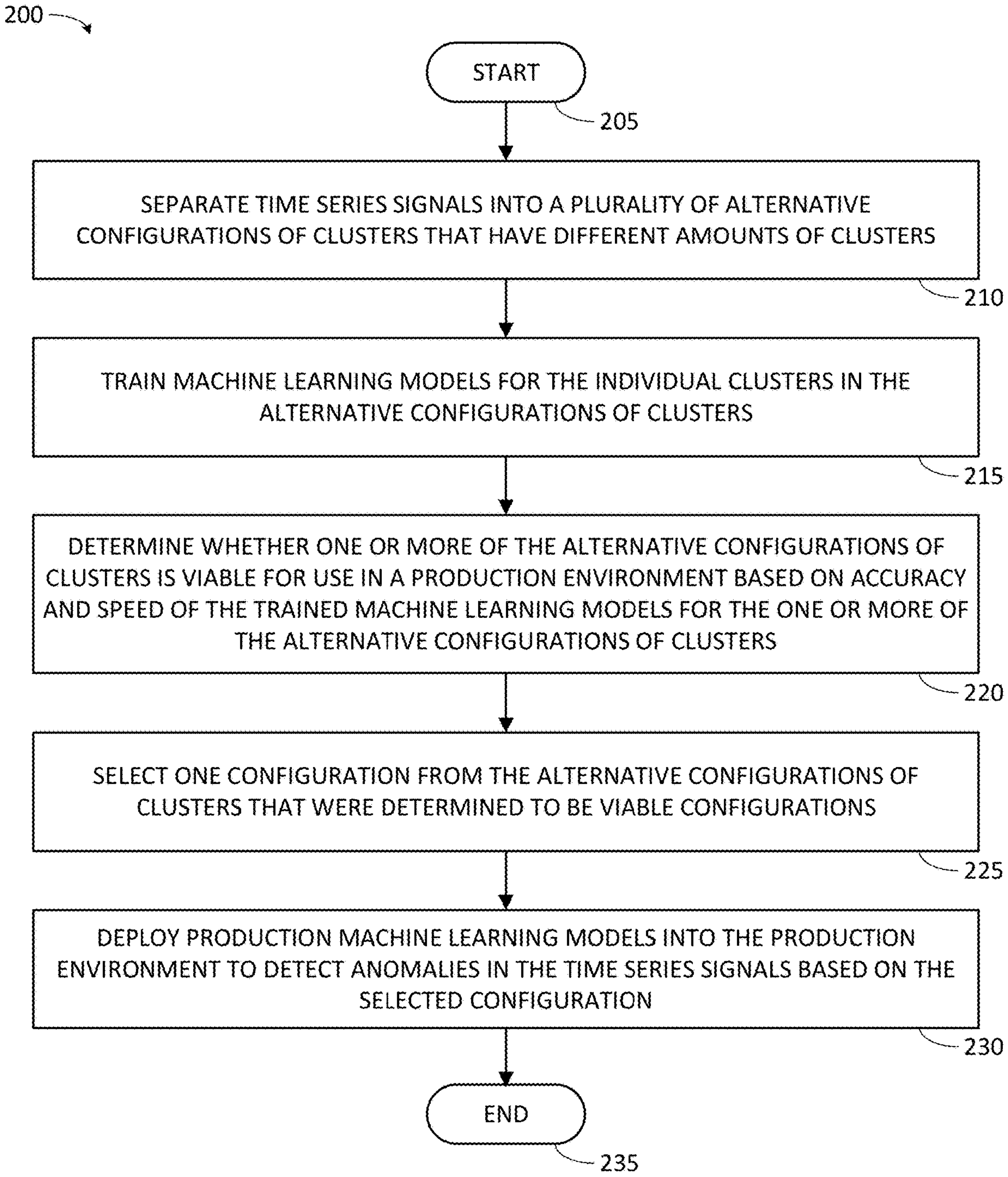
FIG. 2 illustrates one embodiment of a prognostics acceleration method associated with quadratic acceleration boost of compute performance for ML prognostics.

FIG. 2 illustrates one embodiment of a prognostics acceleration method 200 associated with quadratic acceleration boost of compute performance for ML prognostics. In one embodiment, the prognostics acceleration method 200 determines how to split a group of time series signals into correlated clusters in order to speed up prognostic analysis while still meeting minimum accuracy thresholds. Put another way, in one embodiment, the prognostics acceleration method 200 automatically discovers how to break up a collection of time series signals into individual clusters for analysis in a way to get a quadratic reduction in compute cost without sacrificing accuracy.

As an overview, in one embodiment, prognostics acceleration method 200 separates the time series signals into different configurations or groups of clusters of the time series signals. From the clusters of signals in each configuration, prognostics acceleration method 200 trains prognostic ML models for each cluster. Prognostics acceleration method 200 then compares the accuracy of the ML models for each cluster with a minimum accuracy threshold. And, prognostics acceleration method 200 compares the compute time taken for the ML model for the largest cluster in each configuration with a maximum time threshold for completion. Prognostics acceleration method 200 then chooses to deploy one of the configurations of clusters (and associated ML models) that satisfies both thresholds.

In one embodiment, prognostics acceleration method 200 initiates at START block 205 in response to a prognostics acceleration system (such as prognostics acceleration system 100) determining one or more of (i) that an automatic clustering system has received or has been provided access to a set of time series signals; (ii) that an instruction to perform prognostics acceleration method 200 on a set of time series signals has been received; (iii) a user or administrator of a prognostics acceleration system has initiated prognostics acceleration method 200; (iv) it is currently a time at which prognostics acceleration method 200 is scheduled to be run; (v) that one configuration of clusters (and associated ML models) should be selected from among a set of possible configurations of clusters for a collection of time series; or (vi) that prognostics acceleration method 200 should commence in response to occurrence of some other condition. In one embodiment, a computer system configured by computer-executable instructions to execute functions of prognostics acceleration system 100 executes prognostics acceleration method 200. Following initiation at start block 205, prognostics acceleration method 200 continues to process block 210.

Example Method—Separating Signals in Multiple Alternative Ways

At process block 210, prognostics acceleration method 200 separates time series signals into a plurality of alternative configurations of clusters based on correlations between the time series signals. The alternative configurations of clusters differ by amount of individual clusters that the time series signals are separated into. For example, the set of signals are gathered into different numbers of multiple clusters. The different configurations are options to evaluate and choose from for deployment to a production or other environment.

Initially, prognostics acceleration method 200 accesses a plurality of time series signals. In one embodiment, the plurality of time series signals is a collection of time series signals, such as a time series database. In one embodiment, signals have identifiers (such as signal numbers) that associate them with individual sources such as a sensor. The time series signals may be, for example, associated with sensors. The sensors are configured to sense physical phenomena occurring in and/or around assets or components of assets. For example, a time series signal is a sequence of samples at an interval of time of amplitude readings from a sensor.

Where the time series signals are previously recorded, the time series signals may be accessed by retrieving them from storage. Where the time series signals are streaming live or in real time from sensors, the time series signals may be accessed by subscribing to the streams of signal values. The sensors thus transmit or otherwise communicate the signal values to prognostics acceleration method 100. In one embodiment, the time series signals are a training range or training segment of the signals. The training signals are signals designated for use in training of machine learning models. For example, the training signals (or training vectors) represent correct, typical, or expected behavior for the sensed asset.

In one embodiment, prognostics acceleration method 200 generates the clusters by using a clustering algorithm. The clusters are chosen by the clustering algorithm based on correlations between the time series signals. For example, the clustering algorithm identifies subsets of signals that are most correlated. In one embodiment, the clustering algorithm splits up the signals into a specified amount of clusters. In one embodiment, the resulting clusters contain signals of similar periodicity, regardless of other characteristics such as noise. Thus, the clustering algorithm selects individual time series signals for inclusion in a cluster based on a correlation in waveforms between the individual time series signal and the other time series signals that are included in the cluster. In one embodiment, the clustering filters the time series signals to create the clusters, including in a cluster only signals that satisfy a threshold for correlation with signals already in the cluster, and excluding from the cluster signals that do not satisfy the threshold for correlation. In one embodiment, the clustering algorithm operates to gather together into clusters signals that are intercorrelated, although the signals may not necessarily be adjacent to each other by identifier (e.g., signal number).

Thus, in one embodiment, the signals in the clusters have a higher degree of correlation between signals within single clusters (also referred to as "intra-cluster correlation") when compared to correlations between signals that are in separate clusters (also referred to as "inter-cluster correlations"). In other words, for example, the signals within an individual cluster are well correlated with each other, but exhibit lower correlation with signals in other clusters. In one embodiment, the clustering may be performed by a wide variety of available clustering algorithms, such as tri-point clustering, hybrid clustering, K-means clustering, or other clustering algorithms.

As mentioned above, prognostics acceleration method 200 splits the time series signals into clusters in multiple different ways. In one embodiment, the collection of time series signals is split into multiple different amounts of clusters. Breaking a collection of time series signals into different numbers of clusters provides alternative ways to group correlated signals for comparison with each other. Thus, the configurations of clusters resulting from separating the time series signals are referred to herein as alternative configurations of clusters. Thus, in one embodiment, the alternative configurations provide different arrangements or groupings of the signals. Thus, in one embodiment, prognostics acceleration method 200 separates the collection of time series signals into a variety of different configurations of signal clusters. For example, the collection of time series signals is separated into 2 clusters, 3 clusters, . . . , K clusters of correlated signals as alternative configurations. The alternative configurations are test or trial options that will be narrowed in subsequent steps to a final selection for deployment.

In one embodiment, the prognostics acceleration method 200 specifies the amounts of individual clusters to include in the alternative configurations of clusters. That is, the prognostics acceleration method 200 provides the various numbers or quantities of clusters that the time series signals are to be split into. For example, a range for number of clusters k may be specified. For example, a number of clusters k between 2 and a top number of clusters K may be specified. Or, for example, particular values for k may be specified, such as number of clusters k=4, 7, 8, 12. The range of values or particular values for number of clusters k may be provided by user input. The specification of the number of clusters k occurs before separating the plurality of the time series signals into different groups of clusters.

In one embodiment, the number of clusters k that a collection of time series signals may be divided into is constrained by a minimum number of signals $n_{min}$ that can be placed into a cluster. Thus, the maximum number of clusters $K_{max}$ that a collection of N signals can be partitioned into is the quotient of the number of signals N in the collection of signals and the minimum number of signals $n_{min}$ ($K_{max}=N/n_{min}$). As a practical matter, the minimum number of signals $n_{min}$ is 5 or greater. Below five variables, multivariate ML models have little prognostic advantage.

Once the values for the number of clusters k are provided, in one embodiment, prognostics acceleration method 200 iteratively executes the clustering algorithm to separate or partition the time series signals into the specified amounts of individual clusters. This produces a plurality of alternative configurations of clusters. In one embodiment, the clustering algorithm is performed for each amount of clusters k. In one embodiment, prognostics acceleration method 200 instructs the clustering algorithm to separate the time series signals into each number of clusters k in turn. Thus, prognostics acceleration method 200 will separate the set of time series signals multiple times into a different configurations or groups of clusters. The configuration of clusters produced for each time differs by amount of the clusters included in the group. The numbers of clusters in the alternative configurations are therefore not equal. In one embodiment, the iterative execution of the clustering algorithm on the signals for each value of k may be performed in a for loop or other loop.

In one embodiment, prognostic acceleration method 200 indicates to a clustering algorithm how many clusters to split the signals into. For example, prognostic acceleration method 200 might request 2, 4, 6, 8, and 10 clusters, in turn, from the clustering algorithm, and the clustering algorithm will partition the signals into 2 clusters, then 4 clusters, then 6 clusters, then 8 clusters, and then 10 clusters, resulting in 5 distinct configurations of clusters. The clusters are of signals that are more inter-correlated with each other, and less intra-correlated with signals in other clusters.

In one embodiment, the resulting plurality of alternative configurations of clusters is written to storage for subsequent retrieval and processing. In one embodiment, each individual cluster is stored as a time series database of the time series signals belonging to the cluster. And, the clusters may be labeled as to which of the alternative configurations the clusters are included in. For example, the individual clusters in an alternative configuration may be stored together in a data structure for the alternative configuration.

Thus, in one embodiment, prognostics acceleration method 200 separates time series signals into a plurality of alternative configurations of clusters based on correlations between the time series signals by (i) accessing a plurality of time series signals, (ii) determining a set or range for number of clusters k to break the signals into, (iii) iteratively, for each value of k, separating the time series signals into a configuration with k clusters, and (iv) storing the clusters with information that associates the cluster with the configuration. Process block 210 then completes, and prognostics acceleration method 200 continues at process block 215. In one embodiment, the functions of process block 210 are performed by alternative configurations generator 105 of prognostics acceleration system 100. At the conclusion of process block 210, a variety of alternative options for how to cluster the signals for ML prognostic analysis have been generated. The various options for cluster configuration may then be evaluated for their viability for deployment to a particular target computing environment.

Example Method—Training ML Models for Individual Clusters

At process block 215, prognostics acceleration method 200 trains machine learning models for the individual clusters in the alternative configurations of clusters. For example, the signals belonging to the individual clusters are used to configure an ML model for the cluster to detect anomalous behavior in the cluster. Each alternative configuration of clusters is thus provided with trained ML models that correspond to the individual clusters in the configuration. Machine learning models are trained for each of the clusters. The model for a cluster is trained using the signals that are in the cluster. This produces a group of machine learning models associated with each configuration of clusters. The machine learning models in the group associated with a configuration are trained using the signal clusters in the group.

In one embodiment, prognostics acceleration method 200 assigns ML models for each cluster. In one embodiment, each alternative configuration of clusters has its individual clusters assigned to individual machine learning models. In one embodiment, there is a one-to-one relationship or association between an individual cluster and an individual machine learning model. Because individual machine learning models are associated with individual clusters of signals in a particular one of the alternative configurations of clusters, the individual machine learning models may also be referred to as a machine learning models in, of, or for the alternative configuration. Thus, a cluster configuration has a plurality of machine learning models that correspond individually to the clusters of the cluster configuration.

In one embodiment, the time series signals in an individual cluster are assigned as input variables of an individual machine learning model. The machine learning model parses the time series signals of the cluster in an automatic training operation. In one embodiment, less than the entire range or length of the time series signals, such as a specified training range within the time series signals, is used for training. In one embodiment, the training range of the time series signals is made up of a selection of vectors designated as training vectors. The automatic training operation adjusts parameters of the ML model based on the time series signals in the cluster to cause the ML model to produce estimates consistent with the time series signals in the cluster. The training causes the machine learning model to produce estimates of what each signal in the cluster is expected to be based on the actual values of other signals in the cluster. Differences or residuals between the estimates may be provided to a detection model such as SPRT to detect when deviations from expected signal values are anomalous. Additional detail on training of the machine learning model to detect an anomaly is provided below under the heading "Overview of Multivariate ML Anomaly Detection".

Here, each ML model is specific to an individual cluster. The ML model is trained only on the correlated signals that belong to the individual cluster. The remainder of the time series signals that are not well correlated with the signals in the individual cluster are thus filtered out of the inputs to the ML model. Because non-correlated behavior of inputs can reduce the accuracy of an ML model, excluding signals from outside the cluster causes the ML model trained on the signals of the cluster to exhibit improved prognostic accuracy over models that include less correlated signals in their inputs. Thus, the collection of ML models trained for the clusters of correlated signals in the collection of signals is more accurate than one ML model trained with the entire collection of signals. More particularly, the collective ML models for an alternative configuration of clusters generates fewer false alarm probabilities (FAPs) and fewer missed alarm probabilities (MAPs) than the single ML model for the entire collection.

The alternative configurations exhibit this improvement in accuracy to a greater or lesser extent depending on how well correlated the signals in the clusters that make up the alternative configuration are. Thus, the alternative configurations result in different extents of improvement in accuracy, which may be evaluated against thresholds for accuracy, as discussed below.

Once the ML models for the clusters in the alternative configurations have been trained, the ML models (or the parameters for the ML models that resulted from the training) may be written to storage for subsequent retrieval and processing. The ML models may be labeled with which of the clusters and which of the alternative configurations the ML models are associated with.

Thus, in one embodiment, prognostics acceleration method 200 trains machine learning models for the individual clusters in the alternative configurations of clusters by (i) assigning signals of an individual cluster to be inputs of an individual machine learning model for each individual cluster in each alternative configuration, (ii) executing a training operation to adjust parameters of each ML model to produce estimates consistent with the signals in the cluster assigned to the ML model, and (iii) storing the ML models with information to associate the corresponding clusters. Process block 215 then completes, and prognostics acceleration method 200 continues at process block 220. In one embodiment, the functions of process block 215 are performed by ML model trainer 110 of prognostics acceleration system 100. The various cluster configurations are thus given a set of ML models that achieve a quadratic performance improvement over a single ML model for the entire collection of time series signals. The extent of the performance boost may vary from configuration to configuration, and may be analyzed to determine whether a configuration is viable given performance constraints of a target environment.

Example Method—Determining Viability for Use In Production

At process block 220, prognostics acceleration method 200 determines whether one or more of the alternative configurations of clusters is viable for use in a production or target environment. The determination is based on whether the trained machine learning models for the individual clusters in the one or more of the alternative configurations of clusters satisfy an accuracy threshold and a completion time threshold. For example, the prognostics acceleration method 200 first removes from consideration the cluster configurations that are not accurate enough, and then determines which of remaining cluster configurations are fast enough in the target environment. The determinations of "accurate enough" and "fast enough in the target environment" provide a basis for selecting one of the alternative configurations for deployment to the target environment.

In one embodiment, prognostic acceleration method 200 checks whether the ML models built from the clusters are sufficiently accurate to satisfy provided specifications. For example, prognostic acceleration method 200 checks whether the ML models for the clusters are accurate enough to satisfy accuracy agreements with a user. The accuracy of the ML models built from the clusters may be checked against accuracy of a ML model built from the entire collection of time series signals. Or, the accuracy of the ML models built from the clusters may be checked against each other. Cluster configurations that result in one or more insufficiently accurate ML models may be discarded, set aside, or excluded from further consideration for deployment to a target environment.

As used herein, a target environment is a computing environment in which ML models built or trained from clusters of time series signals are to be used to detect anomalies in the overall set of time series signals. The target environment is thus a destination environment for a deployment of cluster configuration of ML models selected by prognostics acceleration method 200. The target environment may also be considered a final, live, or production environment in which the ML models will be used for monitoring or surveillance of live (that is, non-training) ranges of the time series signals.

In one embodiment, prognostics acceleration method 200 executes the trained machine learning models for the individual clusters to determine accuracy levels of the trained machine learning models. In one embodiment, prognostics acceleration method 200 accesses or retrieves the trained ML models for the individual clusters. In one embodiment, prognostics acceleration method 200 then executes the trained machine learning models for the individual clusters. Accuracy level is determined based on analysis with further training data. For example, the trained ML models are executed on an additional training range of the time series signals or further selection of training vectors as test time series signals for accuracy testing. The test signals may have anomalous readings deliberately inserted into them at particular positions. Prognostics acceleration method 200 records alert states produced by the ML models for the test time series signals during the execution. For example, the alert state indicating that "no anomaly is detected" or "an anomaly is detected" is recorded at each vector or observation of the test time series signals.

In one embodiment, prognostics acceleration method 200 determines the accuracy levels of the ML models. In one embodiment, the accuracy of the ML models is prognostic accuracy, or the correctness of alerting based on the estimates by the ML model. Prognostic accuracy levels may be described by two probabilities: (i) a false alert probability (FAP) or α, which is the probability of a Type I error—detecting an anomaly where no anomaly has occurred; and (ii) a missed alert probability (MAP) or β, which is the probability of a Type II error—failing to detect an anomaly where an anomaly has occurred. In one embodiment, prognostics acceleration method 200 determines the FAP and MAP of the individual ML models.

In one embodiment, prognostics acceleration method 200 determines the FAP and MAP of a model by comparing the record of alert states in the test signals to the known non-anomalous behavior and inserted anomalies in the test signals. The comparison may be performed for each position in the test signal. The position in the test signal is determined to hold one of a known non-anomalous value or a known anomalous value (inserted), and the alert state of anomaly/no anomaly for that position is accessed. Where the alert state indicates that an anomaly is detected at a position known to hold a non anomalous value, the ML model has produced a false alert. Where the alert state indicates that no anomaly is detected at a position known to hold an anomalous value, the ML model has produced a missed alert. The FAP for an ML model is the count of false alerts divided by the length of the training signal. The MAP for an ML model is the count of missed alerts divided by the length of the training signal. These FAP and MAP values may be averaged over a plurality of accuracy tests using different test signals. The trained ML models may be labeled with the FAP and MAP scores.

In one embodiment, prognostics acceleration method 200 determines the accuracy levels or accuracy scores of the alternative configurations. An alternative configuration collectively has an accuracy level that is the lowest accuracy (highest error probability) level of trained the ML models for the clusters in the alternative configuration. The accuracy level for a cluster configuration may be expressed as a 2-part tuple of the highest FAP and MAP values from the ML models for the clusters in the configuration. For example, if the two ML models for a two cluster configuration have accuracy levels of $FAP_1=0.025$, $MAP_1=0.05$ and $FAP_2=0.035$, $MAP_2=0.015$, the cluster configuration will have a collective accuracy level of $FAP_C=0.035$, $MAP_C=0.05$. Thus, the collective accuracy level of a cluster configuration is the worst accuracy value for both FAP and MAP among the ML models for the configuration.

In one embodiment, the accuracy testing is done for the ML models of one cluster configuration at a time, gradually iterating through a testing of all the alternative configurations of clusters. In one embodiment, the individual ML models for individual clusters may be tested for accuracy one model at a time.

In one embodiment, prognostics acceleration method 200 retains the alternative configurations for which the trained machine learning models have accuracy levels that satisfy the accuracy threshold or condition. In one embodiment, the accuracy threshold is a pair of maximum values for FAP and MAP. The maximum values for FAP and MAP are minimums for ML model performance in Type I and Type II errors, respectively. These maximums may be provided by a user. For example, the maximum thresholds for FAP and MAP may be variables or parameters stipulated by a service level agreement (SLA) with the user or other configuration file. In one embodiment, prognostics acceleration method 200 accesses or retrieves the minimum values for FAP and MAP.

In one embodiment, prognostics acceleration method 200 compares the accuracy levels of the alternative configurations against the accuracy threshold. In this way, prognostics acceleration method 200 may determine whether the trained ML models for the clusters in a given cluster configuration satisfy the accuracy threshold. In one embodiment, the FAP for the alternative configuration is compared to the maximum value for FAP stipulated by the user. And, the MAP for the alternative configuration is compared to the maximum value for MAP stipulated by the user. In one embodiment, if either FAP or MAP of a cluster configuration exceeds the stipulated maximum value, the cluster configuration fails to satisfy the accuracy threshold. And, where both FAP and MAP of a cluster configuration falls below the stipulated maximum value, the cluster configuration satisfies the accuracy threshold.

In one embodiment, the accuracy threshold is used to weed out cluster configurations that are insufficiently accurate before the more compute-intensive analysis of completion time. Accordingly, cluster configurations that fail to satisfy accuracy threshold are discarded or otherwise set aside or labeled as not sufficiently accurate for an intended anomaly detection application (as indicated by the stipulated maximum MAP and FAP values). And, cluster configurations that do satisfy the accuracy threshold are retained or labeled as accurate enough for the intended anomaly detection application. In one embodiment, functions of the accuracy level analysis and accuracy threshold testing are performed by accuracy tester 155 of viability tester 115 in prognostics acceleration system 100.

Once the subset of the cluster configurations that are all accurate enough has been established, prognostic acceleration method 200 extrapolates how long the ML models for a given configuration of clusters will take to perform prognostic or training operations. In one embodiment, the time taken to perform operations is based on the distribution of the signals in the largest cluster belonging to a configuration. The ML model for the largest cluster in a group will take the largest amount of compute time among the models for the clusters in the group. Thus, when the ML models for the clusters in a given configuration are executed in parallel, the compute time for ML model operations in the configuration is the compute time taken by the ML model for the largest cluster. The ML models for smaller clusters will generally complete before (that is, in less compute time than) the ML model of the largest cluster.

Therefore, in one embodiment, prognostics acceleration method 200 simulates execution in a target environment of the trained machine learning models for the retained alternative configurations to determine completion time for the retained alternative configurations. In one embodiment, the simulation is performed in response to the trained machine learning models for the individual clusters in one of the alternative configurations of clusters satisfying the accuracy threshold. The retained alternative configurations are sufficiently accurate for the intended use case of the user, and are being evaluated as to whether they are fast enough in the target environment for the intended use case of the user.

As used herein, the term target environment indicates a computing setting or configuration in which a given cluster configuration and associated ML models are to be executed for prognostic anomaly detection on an ongoing basis. The target environment may thus also be referred to as a production environment. In one embodiment, the target environment is the hardware and software stack planned to host and perform prognostic analyses with the given cluster configuration and associated ML models.

Completion time may vary based on the target environment, for example due to performance constraints of the target environment. In one embodiment, the target environment has constraints on prognostic speed defined by service level agreements, by physical limitations of the hardware in the underlying stack, or by limitations of the software in the underlying stack. In one embodiment, prognostics acceleration method 200 receives or accesses a configuration of hardware in the production or target environment. The configuration describes the processor speed and memory constraints or limits of the target environment. The constraints may be imposed by physical limitations of the hardware, hardware/software stack, and/or by the parameters specified in the SLA.

In one embodiment, prognostics acceleration method 200 creates a simulation environment that simulates the target environment. For example, the simulation environment may be created by configuring a cloud computing environment to impose or operate under similar constraints to the constraints on the target environment. In the simulation environment, the simulation may provide a similar or same number and speed of processing cores, memory as found in the target environment. In one embodiment, prognostics acceleration method 200 simulates the execution by the hardware in the hardware configuration of one of the trained machine learning models. The trained ML model simulated is the ML model that is trained for a largest cluster in one of the alternative configurations.

Executing the largest ML model (for a largest cluster) in a given configuration of clusters allows prognostics acceleration method 200 to determine a completion time for the configuration based on the simulated execution. For example, the completion time for a given one of the alternative configurations is the processing time to complete the ML prognostic analysis of a pre-determined range or amount of the time series signals. In one embodiment, the range or amount of the time series signals is made up of vectors sampled or selected from the largest cluster of time series signals in the given configuration.

In one embodiment, completion times for the alternative configurations are simulated in a Monte Carlo simulation of the largest ML models for each alternative configuration. In the Monte Carlo simulation for a given cluster configuration, a pre-set quantity q of vectors is sampled or selected from the largest cluster of time series signals to produce a test cluster having length q, a computing task is executed on the test cluster, and the completion time taken from beginning to end of the execution is recorded. The selection-execution-recording process is performed repeatedly with new samplings of q vectors from the largest cluster in the given cluster configuration, and the recorded completion times are averaged to determine the completion time for the given cluster configuration. In one embodiment, the samplings from the largest cluster are random selections of vectors across the largest cluster in the given configuration.

In one embodiment, the computing task in the Monte Carlo simulation is training the ML model for the largest cluster (in a given one of the alternative configurations). Thus, in one embodiment, prognostics acceleration method 200 repeatedly samples q vectors from the vectors in the largest cluster of time series signals to produce a test cluster, trains the largest ML model for the largest cluster in the simulation environment, and measures the completion time taken from initiation of the training to completion of the training. Then, prognostics acceleration method 200 averages the completion times over the training simulations to determine a completion time associated with training the largest cluster in the target environment. In one embodiment, the completion time threshold may be determined to be satisfied or not based on this training time taken to train one of the machine learning models.

In one embodiment, the computing task in the Monte Carlo simulation is monitoring to detect anomalies in the largest cluster (in a given one of the alternative configurations) with the trained ML model for the largest cluster. Thus, in one embodiment, prognostics acceleration method 200 repeatedly samples q vectors from the vectors in the largest cluster of time series signals to produce a test cluster, monitors the largest ML model for the cluster configuration to detect anomalies in the test cluster (by predicting what the signal values in the test cluster should be and comparing them with the actual signal values) in the simulation environment, and measures the completion time taken from initiation of the monitoring to completion of the monitoring. In one embodiment, the completion time may be a time taken to monitor all q observations of the test cluster. In one embodiment, the completion time may be a latency or a time taken to monitor a single observation of the test cluster. Latency completion times may also be averaged over a plurality of or all of the observations in the test cluster. Prognostics acceleration method 200 then averages the completion times over the anomaly detection simulations to determine a completion time associated with monitoring the largest cluster in the target environment. In one embodiment, the completion time threshold may be determined to be satisfied or not based on this monitoring time taken to generate estimates of what a signal value should be by one of the trained machine learning models.

Thus, in one embodiment, prognostics acceleration method 200 determines completion time for clustered ML anomaly detection when pre-clustering the signals and performing the ML anomaly detection using coarse-grain, distributed, concurrent computing on multiple processors with parallel instances of anomaly detection models. Performing the simulation can determine how many of the alternative configurations that are sufficiently accurate are viable options that can actually be used in the target environment. Simulating of the time to task completion based on data characteristics provided by the user to allows prognostics acceleration method 200 to determine—based on the hardware that would be used in the target environment—how fast the cluster configuration needs to be, and what kind of cluster partitioning that they would be needed to meet the SLA requirements. In one embodiment, simulation results are plotted in a 3D plot, such as shown and described with Reference to FIG. 4 below.

In one embodiment, the simulation is compute-time intensive, so it is performed only on sufficiently accurate configurations after the accuracy analysis has eliminated insufficiently accurate configurations. In this way, prognostics acceleration method 200 improves the speed of identifying configurations that will be viable in a target environment over brute force approaches by initially eliminating cluster configurations that are not accurate enough before expending compute resources to simulate compute time. The accuracy tests are less compute time intensive than the simulations. The trained machine learning models for the individual clusters in the one or more of the alternative configurations of clusters are initially evaluated against the accuracy threshold first. Then, a subset of the trained machine learning models for the individual clusters in the one or more of the alternative configurations of clusters that have satisfied the accuracy threshold are subsequently evaluated against the completion time threshold. Thus, in one embodiment, discarding inaccurate cluster configurations before simulating the compute time of the accurate configurations improves the compute time for determining which of the configurations is sufficiently rapid by limiting the simulations to the subset of accurate configurations.

Following completion of the simulation, the completion times are compared with a completion time threshold to determine which of the alternative configurations will be fast enough in the target environment. In one embodiment, prognostics acceleration method 200 determines the retained alternative configurations for which the completion time satisfies the completion time threshold to be viable for deployment to the target environment. In short, the sufficiently accurate configurations that are also sufficiently fast are determined to be viable in the target environment. Configurations are viable for a given environment when they are able to operate in the target environment within the accuracy and completion time parameters specified by the user, for example by the SLA.

Viable configurations may be identified from among the retained (accurate) alternative configurations by comparing the completion time for the alternative configurations to the completion time threshold. In one embodiment, the completion time for an alternative configuration is the averaged completion time from the Monte Carlo simulation of the largest cluster in the alternative configuration. In one embodiment, the completion time threshold is defined or stipulated by a SLA with the end user of a cloud service, which provides a functional specification on maximum allowed completion times. The comparison determines whether the trained machine learning models for the individual clusters that are in a given one of the alternative configurations of clusters satisfy the completion time threshold.

In one embodiment, prognostics acceleration method 200 accesses the maximum allowed completion time specified by the user. Prognostics acceleration method 200 sets the maximum allowed completion time to be the completion time threshold. Prognostics acceleration method 200 compares the completion time for one or more (or all) of the alternative configurations of clusters to the completion time threshold. Where the completion time for an alternative configuration satisfies the completion time threshold, the alternative configuration is a viable alternative for deployment to the target environment. Where the completion time for an alternative configuration does not satisfy the completion time threshold, the alternative configuration is not a viable alternative for deployment to the target environment. In one embodiment, the completion time threshold is satisfied where a completion time remains below the maximum allowed completion time, and the completion time threshold is not satisfied when the completion time exceeds the maximum allowed completion time. In this manner, the alternative configurations of clusters may be further filtered to remove or disqualify those cluster configurations for which prognostic ML analysis will take too long to complete in the target environment. In one embodiment, functions of the completion time simulation and completion time threshold testing are performed by speed tester 160 of viability tester 115 in prognostics acceleration system 100.

In one embodiment, prognostics acceleration process 200 has thus qualified and retained those of the alternative configurations that are sufficiently accurate and rapid to be viable or suitable for operation in the target environment. And, prognostics acceleration process 200 has disqualified and discarded those of the alternative configurations that are not sufficiently accurate or rapid to be viable for operation in the target environment. Once the viable and non-viable alternative configurations have been identified, individual data structures for the alternative configurations may be labeled as to whether the alternative configuration was determined to be viable or not.

Thus, in one embodiment, prognostics acceleration method 200 determines whether one or more of the alternative configurations of clusters is viable for use in a production or target environment by (i) determining the accuracy levels for the trained ML models belonging to the alternative cluster configurations; (ii) retaining the accurate configurations (the alternative configurations that satisfy the accuracy conditions); (iii) accessing a description of the hardware for a target environment; (iv) simulate execution on the hardware of largest trained ML models for each of the accurate configurations to determine completion times (compute times) for the accurate alternative configurations, (v) retain the viable configurations (the accurate configurations that satisfy the completion time threshold); and (vi) store information that labels the viable configurations with completion times and accuracy levels. Process block 220 then completes, and prognostic acceleration method 200 continues at process block 225. In one embodiment, the functions of process block 220 are performed by viability tester 115 of prognostics acceleration system 100. At the conclusion of process block 220, the subset of configurations that are found to be viable for deployment to a target environment by being both sufficiently accurate and sufficiently rapid is identified. One of these viable configurations may then be selected for deployment to the target environment.

Example Method—Selection of One Configuration from Alternatives

At process block 225, prognostic acceleration method 200 selects one configuration from the alternative configurations of clusters that were determined to be viable configurations. In other words, one of the viable alternative configurations is chosen. The one of the viable alternative configurations that is selected is designated for deployment to the target environment. The other, non-selected viable alternative configurations are not designated for deployment. In one embodiment, only one configuration of clusters is needed to perform the anomaly detection in the target environment, and deploying viable multiple configurations would be redundant, so only one of the viable configurations is selected.

In one embodiment, prognostic acceleration method 200 automatically selects one of the viable alternative configurations. For example, prognostic acceleration method 200 chooses one of the configurations for deployment to a target environment based on accuracy and/or speed in the target environment. In one embodiment, a viable configuration with sufficiently accurate ML models and a sufficiently fast compute time may be automatically selected for deployment. For example, configurations may automatically choose the configuration with greatest accuracy that has a time under a time specified in a service level agreement (SLA). Or, for example, prognostic acceleration method 200 may automatically choose the configuration with greatest speed while still meeting minimum accuracy requirements.

Or in one embodiment, the configurations may be presented to a user for selection or confirmation of an automated selection. The configurations may be presented to a user for selection in a graphical user interface. If no configurations yield satisfactory accuracy, within the time constraints on the target environment, the user may be presented with a user-selectable options to adjust service level to accommodate the time, or adjust accuracy requirements to reduce the compute burden. In one embodiment, where only one of the alternative configurations of clusters is viable for use in the target environment, prognostic acceleration method 200 automatically selects the single viable cluster configuration.

In one embodiment, one viable cluster configuration may be selected automatically based on accuracy level of the cluster configuration, or, based on the accuracy levels of the trained ML models for the clusters in the cluster configuration. In one embodiment, the prognostic acceleration method 200 automatically chooses the most accurate of the viable cluster configurations. For example, the most accurate of the alternative configurations may be determined by comparing the accuracy levels of the alternative configurations (as generated in process block 220 above), and then ranking the alternative configurations by accuracy levels to determine the alternative configuration with greatest accuracy. For example, where the accuracy levels are expressed as FAPs and MAPS, prognostic acceleration method 200 automatically selects the viable alternative configuration with the least of both FAP and MAP. Where there is a conflict where a first configuration has a lower FAP than a second configuration, and the second configuration has a lower MAP than the first, or vice versa, prognostic acceleration method 200 may be configured to resolve in favor of the configuration in which the total of MAP and FAP is least.

In one embodiment, one viable cluster configuration may be selected automatically based on speed or completion time of the cluster configuration. In one embodiment, the prognostic acceleration method 200 automatically chooses the most rapid or fastest of the viable cluster configurations. For example, the fastest of the alternative configurations may be determined by comparing the completion time of the alternative configurations (as generated in process block 220 above), and then ranking the alternative configurations by completion time to determine the alternative configuration with least or lowest completion time. For example, prognostic acceleration method 200 automatically selects the viable alternative configuration with the least completion time.

In one embodiment, the user may be presented with an opportunity to confirm the automatic selection of one of the viable alternative configurations. Or, in one embodiment, the user may be presented with the opportunity to change, counteract, or otherwise alter the automatic selection of one of the viable alternative configurations by selecting another alternative configuration. Or, in one embodiment, the user may be presented with the viable alternative configurations in order to make the selection from among the viable alternatives identified by the prognostic acceleration method. For example, prognostic acceleration method 200 may indicate to the user that the user can choose from a population of cluster configurations that satisfies the processing time constraints and the accuracy constraints specified by the user.

In one embodiment, the opportunities to confirm, alter, or make the selection are presented to the user in a graphical user interface (GUI). The user may input confirmations, alterations, or selections of the viable cluster configurations through the GUI. Thus, in one embodiment, the selection process includes generating a GUI and accepting user inputs to complete the selection. In one embodiment, prognostics acceleration method 200 generates a user interface that displays the alternative configurations of clusters that were determined to be viable, for example in a menu. Prognostics acceleration method 200 then transmits the GUI for presentation or display. And, prognostics acceleration method 200 accepts a user input received through the user interface that selects one configuration of clusters. In one embodiment, the user-selectable options for input include, for example: graphical buttons, graphical radio buttons, graphical check boxes, graphical sliders or knobs, menus, text entry fields, and the like. For example, a menu and graphical buttons may be used to accept user input for making and/or confirming a selection of a particular alternative configuration.

In some situations, none of the alternative configurations of clusters may be viable. Prognostics acceleration system may therefore inform the user that a different hardware environment, different accuracy parameters, or different speed will be necessary. In one embodiment, where there are no viable cluster configurations, the GUI may present a message indicating that no cluster configurations will be both sufficiently accurate and sufficiently rapid in the target environment. In response, the GUI may also present user-selectable options to adjust accuracy requirements, adjust time requirements, launch a process to adjust SLA, or launch a process to adjust hardware setup and/or software stack for the target environment. For example, graphical sliders or text entry fields may be used for accepting user inputs to adjust accuracy or compute time thresholds.

Figure 4:
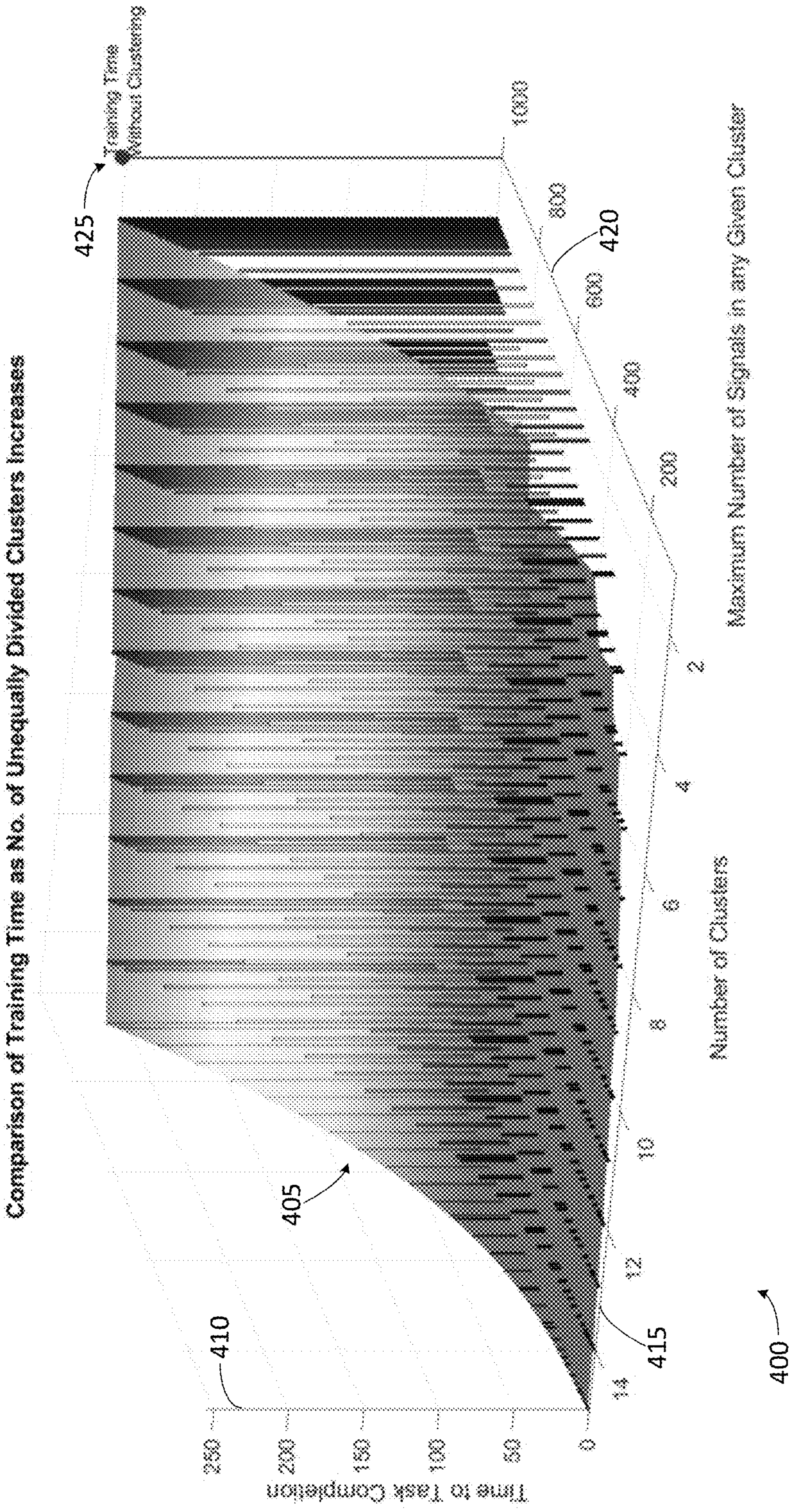
FIG. 4 shows an example 3D plot of a surface function of compute time for ML models that was constructed from a mathematical relationship between cluster size and time complexity.

In one embodiment, the GUI may also present graphical representations of the compute time taken for differing numbers of clusters in a configuration, and the size of the largest cluster in a configuration, such as example 3D plot 400 shown in FIG. 4. In one embodiment, the graphical representation may be made interactive, to show the time, number of clusters, and number of signals in the largest cluster for a currently selected one of the alternative configurations.

Thus, in one embodiment, prognostic acceleration method 200 selects one configuration from the alternative configurations of clusters that were determined to be viable configurations by automatically selecting one of the alternative configurations based on compute time or accuracy of the alternative configuration and/or accepting a user confirmation or selection of one of the alternative configurations. Prognostics acceleration method 200 then labels the selected alternative configuration for deployment. Process block 225 then completes, and prognostic acceleration method 200 continues at process block 230. In one embodiment, the functions of process block 225 are performed by configuration selector 120 of prognostic acceleration system 100. At the conclusion of process block 225, one out of potentially several viable cluster configurations has been chosen for deployment to and use in a target environment. In one embodiment, selection of one cluster configuration causes the one cluster configuration to be deployed to the target environment automatically in response.

Example Method—Deployment to Target/Production Environment

At process block 230, prognostics acceleration method 200 deploys production machine learning models into the production environment to detect anomalies in the time series signals. The deployment is based on the selected configuration.

In one embodiment, prognostics acceleration method 200 accesses or retrieves the selected alternative configuration, and the associated trained ML models for the clusters in the selected alternative configuration. Prognostics acceleration method 200 accesses or retrieves configuration information for the target or production environment that identifies a location of the compute environment. In one embodiment, prognostics acceleration method 200 transmits or transfers the selected alternative configuration to the target environment. In one embodiment, prognostics acceleration method 200 transmits or transfers a description of the clusters in the alternative configuration and the trained ML models for the clusters in the alternative configuration to the target environment as well. In one embodiment, the description of the clusters is a data structure including identifiers for the individual clusters in the alternative configuration, identifiers for the individual signals in the collection of time series signals, and information assigning one or more (or each) of the individual signals to at least one of the clusters (for example by indicating an association between an identifier for a signal and an identifier for a cluster that the signal belongs to). In one embodiment, the transmission or transfer is performed by copying the selected alternative configuration and/or trained ML models and transmitting them over a computer network such as networks 560 (discussed below) to a storage location of the target environment. In another embodiment, new ML models are trained in the target environment. The training is performed using individual signal clusters in the selected alternative configuration to produce new trained ML models for the individual signal clusters. Thus, the ML models deployed can be copies of the ones trained at process block 215 above, or newly trained ML models for the clusters in the selected cluster configuration. In either case, the deployed ML models may also be referred to as production ML models.

In one embodiment, prognostics acceleration method 200 configures the trained production machine learning models to be executed in parallel. In one embodiment, each of the individual ML models for the selected configuration of clusters may be assigned to be executed by a discrete processing unit or processing core. In one embodiment, prognostics acceleration method 200 then monitors the selected configuration of clusters for the anomalies with the trained production machine learning models. In one embodiment, the target environment monitors a live stream of time series signals in real time as observations of the time series signals arrive from the sensors. The target environment uses the trained production ML models to monitor the time series signals that have been partitioned into clusters as specified by the selected cluster configuration.

The clusters in the selected configuration are monitored in parallel by the trained production machine learning models. In response to detecting a particular anomaly in the time series signals with the trained production machine learning models, prognostics acceleration method 200 generating an electronic alert that the particular anomaly has occurred. In one embodiment, during monitoring, differences or residuals may be detected between the arriving stream of time series signal values and the estimates produced by the cluster of ML models monitoring the clusters of the time series signals. These differences may be provided to a detection model such as SPRT to determine whether the differences are indicative of an anomaly. When the differences are deemed as anomalous, an alert is triggered. Otherwise, no alert is triggered. In one embodiment, due to the clustering of correlated signals, the accuracy of estimates and resulting anomaly detections is improved over single-model monitoring. Additional detail on anomaly detection by ML models is provided below under the heading "Overview of Multivariate ML Anomaly Detection".

Process block 230 then completes, and prognostics acceleration method 200 concludes at end block 235. In one embodiment, the functions of process block 230 are performed by production deployer 125 of prognostics acceleration system 100.

In one embodiment, at the conclusion of prognostic acceleration method 200, one specific configuration of ML model clusters has been implemented to perform ML anomaly detection where single-model ML anomaly detection may be unfeasible due to performance constraints of the target operating environment. In one embodiment, the prognostic acceleration method 200 chooses a cluster configuration that both: (i) maintains (or even improves) prognostic accuracy above a minimum requirement for a given use case; and (ii) provides a quadratic improvement in compute time to enable implementation on a speed-constrained target environment. The technology of ML prognostic anomaly detection is thus improved. For example, where hardware performance is limited by physical characteristics, such as the compute capacity of on-board hardware in an aircraft, the prognostic acceleration method 200 can use clustering to reduce the compute cost of ML prognostic monitoring to a level that can be performed by the on-board hardware while still maintaining a level of accuracy in detecting and alerting persons to potentially life-threatening problems. The technology of vehicle safety is thus improved. Other technologies in which available compute capacity is limited may similarly be improved.

Further Embodiments of Example Prognostics Acceleration Method

In one embodiment, separating time series signals into a plurality of alternative configurations of clusters based on correlations between the time series signals (as discussed above at process block 210) further includes choosing different amounts of clusters for a clustering algorithm to separate the time series signals into. Thus, in one embodiment, prognostics acceleration method 200 iteratively executes a clustering algorithm to separate or partition the time series signals into different, specified amounts of individual clusters. In one embodiment, prognostics acceleration method 200 iteratively executes a clustering algorithm to separate the time series signals into specified amounts of individual clusters. And, in one embodiment, prognostics acceleration method 200 specifies the amounts of individual clusters to include in the alternative configurations of clusters. Then, prognostics acceleration method 200 iteratively executes a clustering algorithm to separate the time series signals into the specified amounts of individual clusters. The repeating execution of the clustering algorithm for the different amounts of clusters serves to produce the plurality of alternative configurations of clusters.

In one embodiment, cluster configurations that are insufficiently accurate are first culled from consideration before the remaining alternative configurations are evaluated for viability of deployment to the target or production environment (as discussed above at process block 220). Thus, in one embodiment, prognostics acceleration method 200 executes the trained machine learning models for the individual clusters to determine accuracy levels of the trained machine learning models. Prognostics acceleration method 200 retains (for subsequent consideration for viability) the alternative configurations for which the trained machine learning models have accuracy levels that satisfy the accuracy threshold. Then, prognostics acceleration method 200 simulates execution in a target environment of the trained machine learning models for the retained alternative configurations. In this way, completion times for the retained alternative configurations are determined. Prognostics acceleration method 200 then determines the retained alternative configurations for which the completion time satisfies the completion time threshold to be viable for deployment to the target environment.

In one embodiment, whether trained ML models for an individual cluster satisfy the completion time threshold (as discussed above at process block 220) is determined based on simulating the runtime of the largest (that is, having the most input signals, and therefore slowest) model in the production environment. Thus, in one embodiment, prognostics acceleration method 200 receives a configuration of hardware in the production environment. In response to the trained machine learning models for the individual clusters in one of the alternative configurations of clusters satisfying the accuracy threshold, ML model execution on the hardware is simulated, a completion time is determined, and the completion time is compared to the completion time threshold. In one embodiment, prognostics acceleration method 200 simulates the execution by the hardware in the configuration of one of the trained machine learning models that is trained for a largest cluster that is in the one of the alternative configurations. In one embodiment, prognostics acceleration method 200 determines a completion time for the one of the alternative configurations of clusters based on the simulated execution. And, in one embodiment, prognostics acceleration method 200 compares the completion time to the completion time threshold to determine whether the trained machine learning models for the individual clusters that are in the one of the alternative configurations of clusters satisfy the completion time threshold.

In one embodiment, whether trained ML models for a configuration of clusters satisfy the accuracy threshold (as discussed above at process block 220) is determined based on the individual accuracy scores for models for clusters included in the configuration. In one embodiment, prognostics acceleration method 200 executes the trained machine learning models for the individual clusters in one of the alternative configurations to determine accuracy levels of the trained machine learning models for the individual clusters that are in the one of the alternative configurations. Then, in one embodiment, prognostics acceleration method 200 compares the accuracy levels against the accuracy threshold to determine whether the trained machine learning models for the individual clusters that are in the one of the alternative configurations of clusters satisfy the accuracy threshold.

In one embodiment (as discussed above at process block 220), the cluster configurations are assessed for accuracy before being assessed for completion time. In one embodiment, insufficiently accurate configurations are removed from consideration, and the remining, sufficiently accurate configurations are then further evaluated for speed. Thus, in one embodiment, the trained machine learning models for the individual clusters in the one or more of the alternative configurations of clusters are initially evaluated against the accuracy threshold. A subset of the trained machine learning models for the individual clusters in the one or more of the alternative configurations of clusters that have satisfied the accuracy threshold are then subsequently evaluated against the completion time threshold.

In one embodiment (as discussed above at process block 220), the completion time threshold is determined to be satisfied based on a training time taken to train one of the machine learning models. Or, in one embodiment, the completion time threshold is determined to be satisfied based on a monitoring or prediction time taken to generate an estimate of what signal values should be by one of the trained machine learning models.

In one embodiment, following deployment as discussed above at process block 230, the trained production machine learning models are used to monitor the time series signals for anomalies. In one embodiment, prognostics acceleration method 200 configures the trained production machine learning models to be executed in parallel. Then, prognostics acceleration method 200 monitors the selected configuration of clusters for the anomalies with the trained production machine learning models. The clusters in the selected configuration are monitored in parallel by the trained production machine learning models. And, in response to detecting a particular anomaly in the time series signals with the trained production machine learning models, prognostics acceleration method 200 generates an electronic alert that the particular anomaly has occurred.

In one embodiment, as discussed above in process block 225, selecting one configuration is performed automatically or autonomously. In one embodiment, prognostics acceleration method 200 selects one configuration from the alternative configurations of clusters that were determined to be viable by automatically selecting the one configuration based on accuracy levels of the trained machine learning models that were trained for the individual clusters in the one configuration. In one embodiment, prognostics acceleration method 200 selects one configuration from the alternative configurations of clusters that were determined to be viable by automatically selecting the one configuration based on completion times of the trained machine learning models that were trained for the individual clusters in the one configuration.

In one embodiment, as discussed above in process block 225, selecting one configuration includes presenting one or more viable options for selection or confirmation by a user. In one embodiment, prognostics acceleration method 200 selects one configuration from the alternative configurations of clusters that were determined to be viable by presenting the viable configuration options in a GUI and accepting a user input to select a configuration. In one embodiment, prognostics acceleration method 200 generates a user interface that displays the alternative configurations of clusters that were determined to be viable. Then, prognostics acceleration method 200 accepts a user input through the user interface that selects the one configuration of clusters.

In one embodiment, as discussed above in process block 210, clusters may be constrained to have at least minimum number of signals for retention of prognostic ability. Thus, in one embodiment, each of the clusters includes five or more of the time series signals.

Additional Embodiments and Discussion

In multivariate Machine Learning (ML) Anomaly Detection (AD), the compute cost scales approximately linearly with the number of observations being analyzed. And, the compute cost scales quadratically with the number of signals being monitored. Thus, increases in signal sampling rate for the signals cause compute cost to scale in a linear manner, while increases in number of sensors producing signals cause compute cost to scale in a quadratic manner (by the second power of the number of sensor signals).

This "square law" compute-cost rule applies to diverse forms of ML AD, including neural networks (NNs), Support Vector Machines (SVMs), the Multivariate State Estimation Technique (MSET), auto-associative kernel regression (AAKR), and linear regression (LR).

In general, multivariate anomaly detection is based on some degree of cross correlation among the signals being monitored. But, many types of assets monitored by physical sensors do not have uniform cross correlations among all possible pairwise combinations of signals. Instead, it is common that there are clusters of signals that may be very well correlated within each cluster, but poorly correlated between clusters.

There exist a variety of clustering algorithms to automatically gather time series signals into clusters of time series signals that are more correlated with each other within the cluster, and less correlated with signals in other clusters. For example, time series signals can be separated into clusters of correlated signals by tri-point clustering (as described in U.S. Pat. No. 9,514,213), by hybrid clustering (as described in U.S. Pat. No. 10,452,510), or a number of other clustering algorithms.

Regardless of clustering algorithm, pre-clustering of the signals that will be monitored by advanced multivariate pattern recognition ML algorithms will result in lower compute cost (CC). These compute cost savings come from the "square law" increase in compute cost as the number of signals increases. Consider a simple example where an asset is monitored by 100 sensors and the total compute cost for training the ML algorithm on a computer processor (such as core of a multi-core CPU, or a CPU or GPU). Then where the database of signals is separated into two clusters, each with 50 correlated sensors, the completion time for running the two individual clusters in parallel on two processors (cores, CPUs, or GPUs) would be ¼th of the completion time for running the full database of signals on one processor. Note that this reduction in time exceeds the halving of completion time due to parallelization. The above is a very simple example of uniformly-sized clusters, in which the signals are distributed evenly among the clusters and clusters have the same number of signals.

However, if the clustering operation results in uneven numbers of signals in the various number k of clusters, estimating the completion time for coarse-grain parallelism (i.e., running k instances of ML anomaly detection, such as MSET, on k clusters concurrently) is by no means a trivial undertaking. Note, compute demand is unique based on the time series data supplied by a user, and the correlations between signals in the data. This prevents using a static lookup table for choosing a configuration of clusters.

The brute force approach to evaluate the total completion time for a set of N time series signals to learn the compute-cost savings obtained by clustering into two or more clusters, where the individual clusters can have different numbers of signals in each cluster, would be to measure the running of the ML anomaly detection (such as MSET) very many times covering various cluster configurations, for example: no clustering (that is, one cluster of the whole set of time series signals); two clusters, with the number of signals in each cluster varying from minimum possible number of signals to maximum possible number of signals; three clusters, with the number of signals in each cluster varying from minimum number of signals possible to maximum number of signals possible; and so on through a maximum possible number of clusters, again, with the number of signals in each cluster varying from the minimum to the maximum number of signals.

In use cases for an asset with larger numbers of signals (like 1,000 or 10,000 or larger), a brute force method of characterizing the total expected compute cost and completion time would result in an enormous number of runs to cover all the possible numbers of clusters k and the variety of lopsidedness (differences or variations) versus balance (equality) in number of signals in the various clusters.

In one embodiment, a prognostic ML compute-cost characterization method is presented that can systematically determine the expected completion time for clustered ML anomaly detection. In one embodiment, as discussed above with reference to process block 220, the prognostic ML compute-cost characterization method determines completion time for clustered ML anomaly detection when pre-clustering the signals and performing the ML anomaly detection using coarse-grain, distributed, concurrent computing on multiple processors with parallel instances of anomaly detection models (such as MSET).

In one embodiment, the prognostics acceleration systems and methods described herein uses a clustering algorithm to divide the universe of unlabeled time series data into two or more clusters, as discussed above with reference to process block 210. This clustering reduces dimensionality of a signal database and thereby decreases the memory footprint and drastically (quadratically) decreases the completion time for ML prognostics analyses.

In one embodiment, the prognostics acceleration systems and methods described herein substantially increase the overall computational throughput and lowers latency of time series anomaly detection quadratically. In one embodiment, the prognostics acceleration systems and methods described herein produce this this speed improvement on a wide variety of computer platforms.

In one embodiment, the prognostics acceleration systems and methods described herein allows accurate characterization of the quadratic acceleration boost (that is, the overall speedup in completion time) without having to run thousands of cases to discover the optimum degree of clustering needed to meet an overall functional specification on maximum allowed completion times. For example, the functional specification on maximum allowed completion times may be provided in order to meet Service Level Agreement specifications for customers of cloud-based ML anomaly detection. In one embodiment, this characterization is accurate even for use cases with uneven clustering.

In one embodiment, the prognostics acceleration systems and methods described herein improves ML prognostic surveillance by reducing the compute cost and memory required for time series anomaly detection without sacrificing accuracy that leads to less false-alarm rates for ML prognostic anomaly discovery. In one embodiment, the prognostics acceleration systems and methods described herein provides an automated time series compute-cost characterization method for increasing throughput and processing efficiency without diminishing accuracy for prognostic regression-based machine learning.

In one embodiment, the prognostics acceleration systems and methods described herein improves ML prognostic surveillance by automatically determining how to (or whether it is possible to) make use of the quadratic acceleration boost to perform ML prognostics within time and accuracy constraints on a given cloud computing platform or cloud tenancy.

There are trade-offs when analyzing an entire time series database of signals compared to analyzing clustered signals.

It is generally believed to be advantageous to train any machine learning model with more data. Larger and more diverse data sets are usually considered to generate higher quality ML models, encompass more edge cases, and thereby reduce FAPs and MAPs, albeit at the cost of computational efficiency. But, experimentation with the prognostics acceleration systems and methods described herein has dispelled the notion that more data is inherently superior.

Instead, smartly reducing the dimensionality by means of signal clustering in accordance with the prognostics acceleration systems and methods described herein results in increased accuracy (due to correlated clustering) and a quadratic reduction in compute time when compared with a single model for the entire collection of time series signals. When a large signal database containing groups of uncorrelated signals is analyzed by ML, the resulting model will provide specious results because the algorithm will attempt to accommodate the differences between the groups into a more general model. Whereas if the database was clustered into highly correlated groups before deploying ML, the resulting model will be much more precise. The prognostics acceleration systems and methods described herein exhibit the increase in precision afforded by clustering because there is a reduction in false alarm probability (FAP), as has been verified experimentally.

For example, an example 20 signal time series database that includes two subsets of 10 signals with similar periodicities (clusters). When there is no anomaly in the signals, a model for all 20 signals and two models for the two clusters of 10 correlated signals are essentially equivalent. Moreover, there is no significant statistical difference between the residuals generated from the 20-signal model and the two 10-signal models. This conclusion is evidenced by the empirical alphas (the final values of the tripping frequency), that are well below the target FAP value, which in this case is 0.01.

Figure 3:
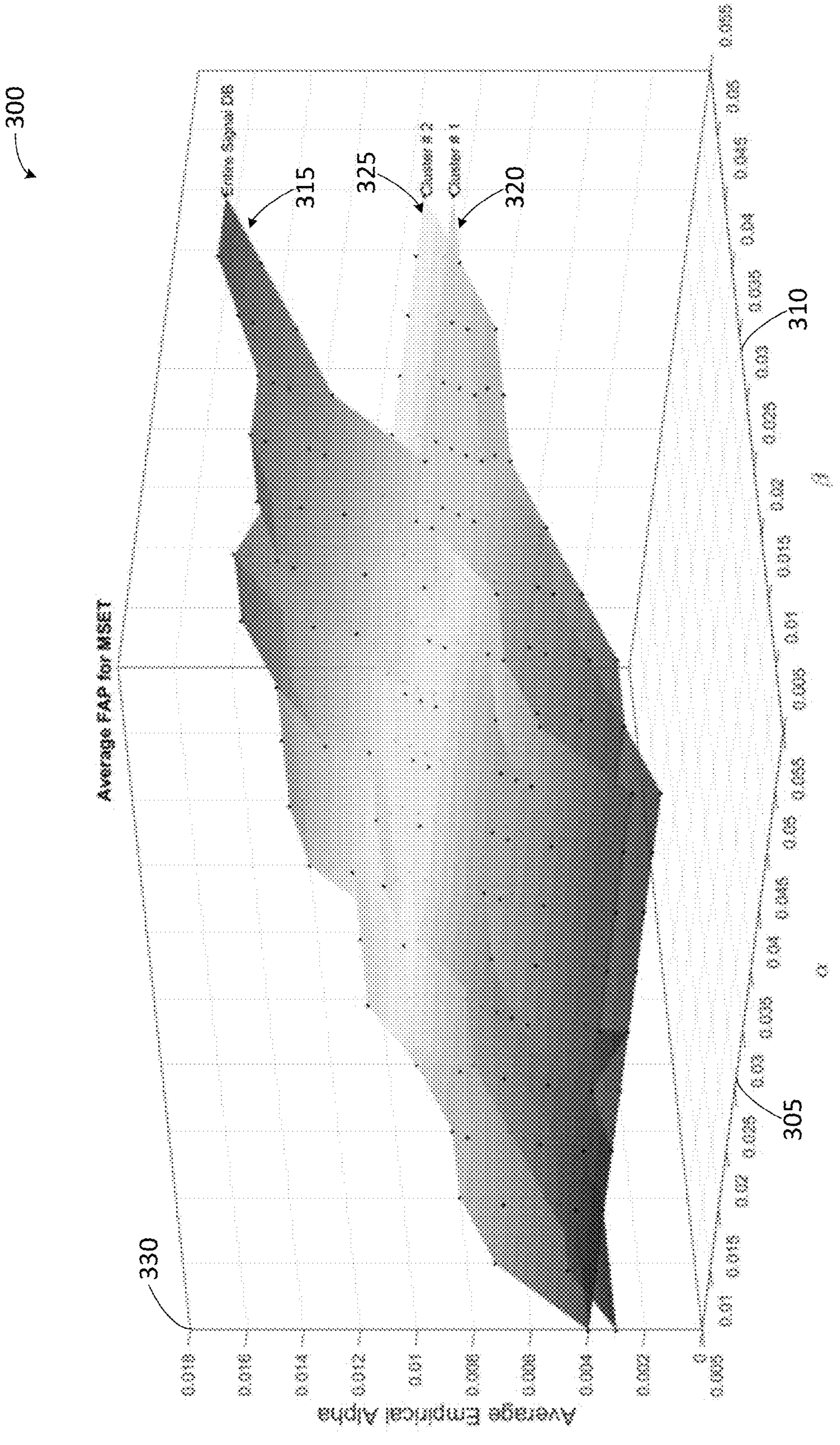
FIG. 3 shows an example parametric comparison plot of empirical alpha of the three different ML models as target false alert probability and missed alert probability are varied for a sequential probability ratio test.

More evidence that smaller, more correlated, cluster models, are higher quality is presented in FIG. 3. A parametric Monte Carlo analysis tracking the empirical FAP for each model was conducted. FIG. 3 shows an example parametric comparison plot 300 of empirical alpha of the three different models as target FAP and MAP are varied for a sequential probability ratio test (SPRT) (an anomaly detection test). The two varying parameters were the SPRT target FAP and MAP values alpha (plotted on x-axis 305), and beta (plotted on y-axis 310), respectively. Empirical alpha for a model for the entire set of 20 signals (entire signal DB surface 315), empirical alpha for a first cluster of 10 signals (cluster #1 surface 320), and empirical alpha for a second cluster of 10 signals (cluster #2 surface 325) are each plotted as 3D surfaces in parametric comparison plot 300. The empirical FAP (plotted against z-axis 330) for the 10-signal cluster models and the 20-signal model are only marginally different when the target alpha and beta are small. However, as the boundaries on alpha and beta increase, the performance of the 20-signal model degrades and entire signal DB surface 315 diverges from cluster #1 surface 320 and cluster #2 surface 325 for the 10-signal cluster models. Additionally, performance of the 10-signal cluster models are relatively consistent and do not vary much between each other.

A secondary analysis was conducted to compare the performance of the larger models to the reduced models. In this analysis two ramp-style faults were inserted into the database at observation 1500, one for each cluster, and the ML model results were compared. The time to first alarm for the 20-signal case occurs sooner than the 10-signal models, but only very minimally. Additionally, there is no meaningful change in the ability of the ML model to correctly identify the degradation occurring within each model. The raw alarm numbers substantiate the conclusions made by comparing the tripping frequencies for the 20-signal case and two 10-signal cases: clustering and degradation have little to no effect in the FAP of a dataset. Note that any spurious alerts are below the specified alpha of 0.01 and therefore hold no significance.

To conduct a robust comparison of compute costs for each case, a Monte Carlo nested loop simulation is performed, and results presented in FIG. 4. In one embodiment, the Monte-Carlo simulation analyzes the compute time for many different configurations of clusters. FIG. 4 shows an example 3D plot 400 of a surface function 405 of compute time for ML models (plotted on z-axis 410) that was constructed from the mathematical relationship between cluster size and time complexity. The two varying parameters are the number of clusters (plotted on x-axis 415), and maximum number of signals in any given cluster (plotted on y-axis 420). For example, the compute time may be either training time or prediction time, although only training time is shown in FIG. 4. We can see, along x-axis 415, as the maximum cluster size increases, the time for task completion also increases. But, along y-axis 420, as the number of defined clusters increases, the time complexity decreases. The amount of training time (for the maximum number of signals in a cluster (e.g., 1000 signals) is shown at training time without clustering point 425. This surface function 405 may be used as a tool to estimate the computation cost for any given cluster size.

The time complexity, being directly proportional to the square of the number of signals, is reduced by a power of 2 when the clusters are processed in parallel. While the decrease in computational complexity reduces consistently when the clusters evenly divide, this is often not the case in practical engineering assets. In complex engineered systems there are correlated dynamics (changes in signal amplitude over time) that may be distributed unevenly among the recorded telemetry signals. Thus, the clusters could have an uneven distribution of signals. Even in the situation where the clusters are unevenly divided, there will be a speed-up factor. But, it may not necessarily be as dramatic as if the signals are evenly split among the clusters (i.e., where the clusters have approximately equal numbers of signals). Further, a constraint of a minimum number of signals contained in a cluster may be imposed. For example, the minimum may be five signals in a cluster, as there is a hinderance to model performance when the number of signals in clusters dips below this number. As such, if the clusters are processed in parallel, there will always be a decrease in computation time regardless of the cluster size. Furthermore, the relationship between the computational cost in the cluster size can be extrapolated from the ideal case.

In one embodiment, the prognostics acceleration systems and methods described herein automatically determine how many correlated clusters a set of time series signals should be split into for deployment to a particular target environment (such as a production environment). Subdividing sets of time series signals (TSSs) into smaller subsets (such as clusters) that are processed with ML models for the subsets improves processing speed by a power of 2 (quadratically) over handling all of the TSSs with one ML model for the full set. Clustering retains (or even improves) accuracy that is lost by naïve partitioning, but may reduce the improvement in speed because it results in clusters of varying size.

In one embodiment, the prognostics acceleration systems and methods described herein automatically choose an amount of clusters that causes the collective predictions of the models for the clusters to be sufficiently accurate, but also to complete processing sufficiently rapidly. Thus, in one embodiment, the prognostics acceleration systems and methods described herein breaks up the set of TSSs into alternative configurations of clusters in which the alternative configurations have different amounts of clusters from each other. Then, the prognostics acceleration systems and methods described herein compares collective performance of ML models for the configurations of clusters against each other in order to determine which number of clusters to break the TSSs into. For example, the prognostics acceleration systems and methods described herein determine which amount of clusters (and amount of ML models dedicated to those clusters) a set of time signals may be separated into to achieve a speed improvement boost while still maintaining required accuracy.

—Overview of Multivariate ML Anomaly Detection—

In general, multivariate ML modeling techniques used for ML anomaly detection predict or estimate what each signal should be or is expected to be based on the other signals in a database or collection of time series signals. The predicted signal may be referred to as the “estimate” or “prediction”. A multivariate ML anomaly detection model is used to make the predictions or estimates for individual variables based on the values provided for other variables. For example, for Signal 1 in a database of N signals, the multivariate ML anomaly detection model will generate an estimate for Signal 1 using signals 2 through N.

In one embodiment, the ML anomaly detection model may be a non-linear non-parametric (NLNP) regression algorithm used for multivariate anomaly detection. Such NLNP regression algorithms include auto-associative kernel regression (AAKR), and similarity-based modeling (SBM) such as the multivariate state estimation technique (MSET) (including Oracle’s proprietary Multivariate State Estimation Technique (MSET2)). In one embodiment, the ML anomaly detection model may be another form of algorithm used for multivariate anomaly detection, such as a neural network (NN), Support Vector Machine (SVM), or Linear Regression (LR).

The ML anomaly detection model is trained to produce estimates of what the values of variables should be based on training with exemplar vectors that are designated to represent expected, normal, or correct operation of a monitored asset. To train the ML anomaly detection model, the exemplar vectors are used to adjust the ML anomaly detection model. A configuration of correlation patterns between the variables of the ML anomaly detection model is automatically adjusted based on values for variables in the exemplar vectors. The adjustment process continues until the ML anomaly detection model produces accurate estimates for each variable based on inputs to other variables. Sufficient accuracy of estimates to conclude determine the ML anomaly detection model to be sufficiently trained may be determined by residuals—a residual is a difference between an actual value (such as a measured, observed, sampled, or resampled value) and an estimate, reference, or prediction of what the value is expected to be—being minimized below a pre-configured training threshold. At the completion of training, the ML anomaly detection model has learned correlation patterns between variables.

Following training, the ML anomaly detection model may be used to monitor time series signals. Subtracting an actual, measured value for each signal from a corresponding estimate gives the residuals or differences between the values of the signal and estimate. Where there is an anomaly in a signal, the measured signal value departs from the estimated signal value. This causes the residuals to increase, triggering an anomaly alarm. Thus, the residuals are used to detect such anomalies where one or more of the residuals indicates such a departure, for example by becoming consistently excessively large.

For example, the presence of an anomaly may be detected by a sequential probability ratio test (SPRT) analysis of the residuals, as discussed in detail above. In one embodiment, the SPRT calculates a cumulative sum of the log-likelihood ratio for each successive residual between an actual value for a signal and an estimated value for the signal, and compares the cumulative sum against a threshold value indicating anomalous deviation. Where the threshold is crossed, an anomaly is detected, and an alert indicating the anomaly may be generated.

—Electronic Alerts—

In one embodiment, an electronic alert is generated by composing and transmitting a computer-readable message. The computer readable message may include content describing the anomaly that triggered the alert, such as a time when the anomaly was detected, an indication of the signal value that caused the anomaly, an identification of a signal for which the anomaly occurred and the alert is applicable. In one embodiment, an electronic alert may be generated and sent in response to a detection of an anomalous signal value. The electronic alert may be composed and then transmitted for subsequent presentation on a display or other action.

In one embodiment, the electronic alert is a message that is configured to be transmitted over a network, such as a wired network, a cellular telephone network, wi-fi network, or other communications infrastructure. The electronic alert may be configured to be read by a computing device. The electronic alert may be configured as a request (such as a REST request) used to trigger initiation of a function in response to detection of an anomaly in a signal, such as triggering a maintenance response for the underlying asset or a reduction of power (e.g., slowdown or shutdown) of the underlying asset represented by the signal. In one embodiment, the electronic alert may be presented in a user interface such as a graphical user interface (GUI) by extracting the content of the electronic alert by a REST API that has received the electronic alert. The GUI may present a message, notice, or other indication that the status of operation of a specific asset or component has entered (or left) an anomalous state of operation.

Cloud or Enterprise Embodiments

In one embodiment, the present system (such as prognostics acceleration system 100) is a computing/data processing system including a computing application or collection of distributed computing applications for access and use by other client computing devices that communicate with the present system over a network. In one embodiment, prognostics acceleration system 100 is a component of a time series data service that is configured to gather, serve, and execute operations on time series data. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions. In one embodiment, prognostics acceleration system 100 is a centralized server-side application that provides at least the functions disclosed herein and that is accessed by many users by way of computing devices/terminals communicating with the computers of prognostics acceleration system 100 (functioning as one or more servers) over a computer network. In one embodiment prognostics acceleration system 100 may be implemented by a server or other computing device configured with hardware and software to implement the functions and features described herein.

In one embodiment, the components of prognostics acceleration system 100 may be implemented as sets of one or more software modules executed by one or more computing devices specially configured for such execution. In one embodiment, the components of prognostics acceleration system 100 are implemented on one or more hardware computing devices or hosts interconnected by a data network. For example, the components of i prognostics acceleration system 100 may be executed by network-connected computing devices of one or more computer hardware shapes, such as central processing unit (CPU) or general-purpose shapes, dense input/output (I/O) shapes, graphics processing unit (GPU) shapes, and high-performance computing (HPC) shapes.

In one embodiment, the components of prognostics acceleration system 100 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Components of prognostics acceleration system 100 may (i) generate or compose an electronic message or signal to issue a command or request to another component, (ii) transmit the message or signal to other components of prognostics acceleration system 100, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, remote computing systems may access information or applications provided by prognostics acceleration system 100, for example through a web interface server. In one embodiment, the remote computing system may send requests to and receive responses from prognostics acceleration system 100. In one example, access to the information or applications may be effected through use of a web browser on a personal computer or mobile device. In one example, communications exchanged with prognostics acceleration system 100 may take the form of remote representational state transfer (REST) requests using JavaScript object notation (JSON) as the data interchange format for example, or simple object access protocol (SOAP) requests to and from XML servers. The REST or SOAP requests may include API calls to components of prognostics acceleration system 100.

Software Module Embodiments

In general, software instructions are designed to be executed by one or more suitably programmed processors accessing memory. Software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

Computing Device Embodiment

Figure 5:
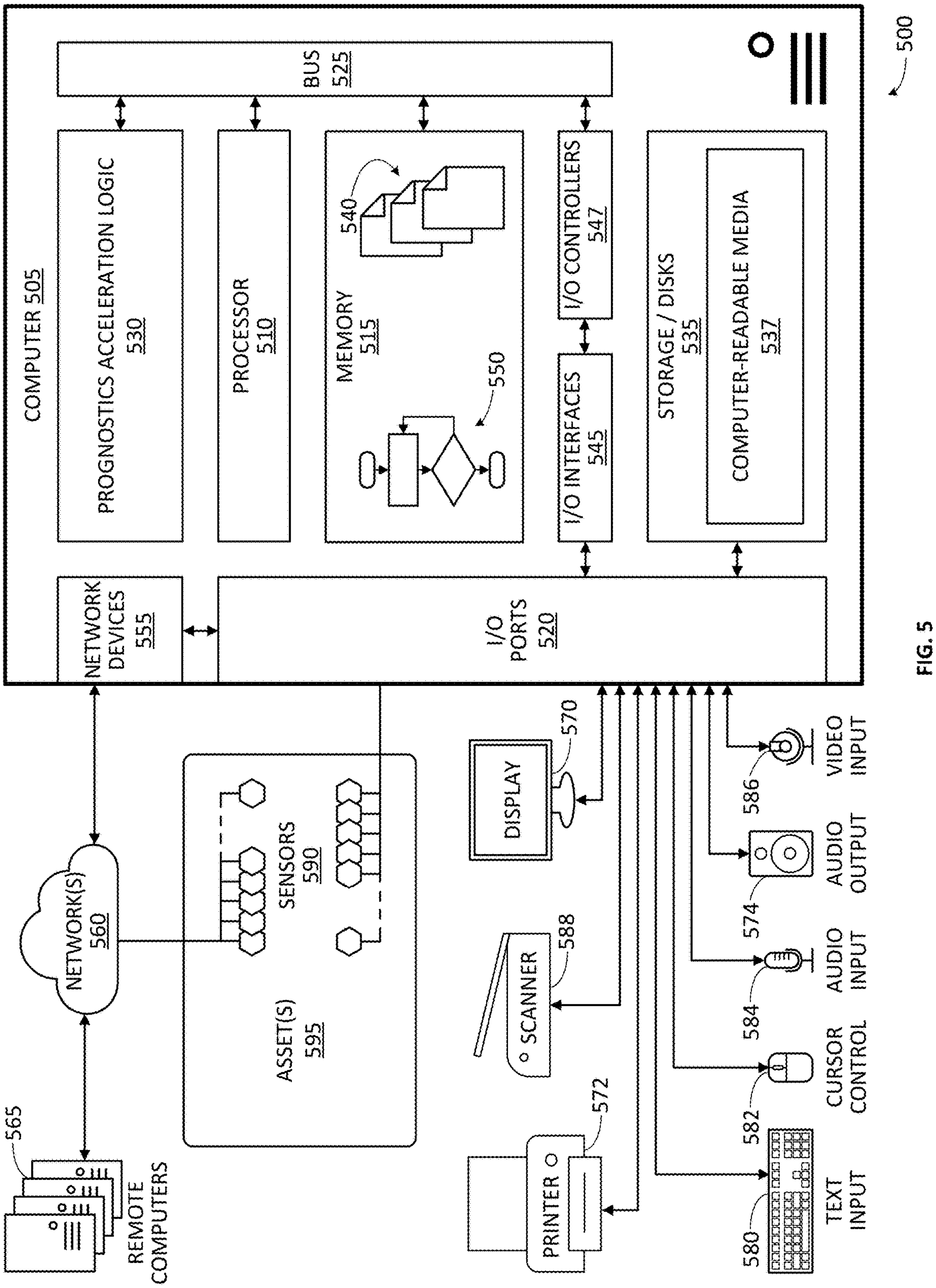
FIG. 5 illustrates an embodiment of a computing system configured with the example systems and/or methods disclosed.

FIG. 5 illustrates an example computing system 500. Example computing system 500 includes an example computing device that is configured and/or programmed as a special purpose computing device with one or more of the example systems and methods described herein, and/or equivalents. The example computing device may be a computer 505 that includes at least one hardware processor 510, a memory 515, and input/output ports 520 operably connected by a bus 525. In one example, the computer 505 may include prognostics acceleration logic 530 configured to facilitate quadratic acceleration boost of compute performance for ML prognostics similar to the logic, systems, methods, and other embodiments shown and described with reference to in FIGS. 1, 2, 3, and 4.

In different examples, the logic 530 may be implemented in hardware, a non-transitory computer-readable medium 537 with stored instructions, firmware, and/or combinations thereof. While the logic 530 is illustrated as a hardware component attached to the bus 525, it is to be appreciated that in other embodiments, the logic 530 could be implemented in the processor 510, stored in memory 515, or stored in disk 535.

In one embodiment, logic 530 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate quadratic acceleration boost of compute performance for ML prognostics. The means may also be implemented as stored computer executable instructions that are presented to computer 505 as data 540 that are temporarily stored in memory 515 and then executed by processor 510.

Logic 530 may also provide means (e.g., hardware, non-transitory computer-readable medium that stores executable instructions, firmware) for performing one or more of the disclosed functions and/or combinations of the functions.

Generally describing an example configuration of the computer 505, the processor 510 may be a variety of various processors including dual microprocessor and other multi-processor architectures. A memory 515 may include volatile memory and/or non-volatile memory. Non-volatile memory may include, for example, ROM, PROM, and so on. Volatile memory may include, for example, RAM, SRAM, DRAM, and so on.

A storage disk 535 may be operably connected to the computer 505 via, for example, an input/output (I/O) interface (e.g., card, device) 545 and an input/output port 520 that are controlled by at least an input/output (I/O) controller 547. The disk 535 may be, for example, a magnetic disk drive, a solid-state disk drive, a floppy disk drive, a tape drive, a Zip drive, a flash memory card, a memory stick, and so on. Furthermore, the disk 535 may be a CD-ROM drive, a CD-R drive, a CD-RW drive, a DVD ROM, and so on. The memory 515 can store a process 550 and/or a data 540, for example. The disk 535 and/or the memory 515 can store an operating system that controls and allocates resources of the computer 505.

The computer 505 may interact with, control, and/or be controlled by input/output (I/O) devices via the input/output (I/O) controller 547, the I/O interfaces 545, and the input/output ports 520. Input/output devices may include, for example, one or more displays 570, printers 572 (such as inkjet, laser, or 3D printers), audio output devices 574 (such as speakers or headphones), text input devices 580 (such as keyboards), cursor control devices 582 for pointing and selection inputs (such as mice, trackballs, touch screens, joysticks, pointing sticks, electronic styluses, electronic pen tablets), audio input devices 584 (such as microphones or external audio players), video input devices 586 (such as video and still cameras, or external video players), image scanners 588, video cards (not shown), disks 535, network devices 555, and so on. The input/output ports 520 may include, for example, serial ports, parallel ports, and USB ports.

The computer 505 can operate in a network environment and thus may be connected to the network devices 555 via the I/O interfaces 545, and/or the I/O ports 520. Through the network devices 555, the computer 505 may interact with a network 560. Through the network, the computer 505 may be logically connected to remote computers 565. Networks with which the computer 505 may interact include, but are not limited to, a LAN, a WAN, and other networks.

In one embodiment, the computer may be connected to sensors 590 through I/O ports 520 or networks 560 in order to receive information about physical states of a monitored asset 595. In one embodiment, sensors 590 are configured to generate sensor readings of physical phenomena occurring in or around an asset 595. The assets generally include any type of machinery or facility with components that perform measurable activities or produce physical phenomena. In one embodiment, sensors 590 may be operably connected or affixed to assets or otherwise configured to detect and monitor physical phenomena occurring in or around the asset 595. The sensors 590 may produce sensor readings of the asset 595 at high frequencies.

In one embodiment, the sensors 590 may include (but are not limited to): a temperature sensor, a vibration sensor, an ultrasonic sensor, an IR-thermal sensor, an accelerometer, a voltage sensor, a current sensor, a pressure sensor, a rotational speed sensor, a flow meter sensor, a speedometer or other speed sensor, an airspeed sensor or anemometer, a microphone, an electromagnetic radiation sensor, a proximity sensor, a gyroscope, an inclinometer, a global positioning system (GPS) sensor, a fuel gauge, a torque sensor, a flex sensor, a nuclear radiation detector, or any of a wide variety of other sensors or transducers for generating electrical signals that represent sensed physical phenomena, for example physical phenomena occurring in or around an asset.

In one embodiment, computer 505 is configured with logic, such as software modules, to collect readings from sensors 590 and store them as observations in a time series data structure such as a time series database. In one embodiment, the computer 505 polls sensors 590 to retrieve sensor telemetry readings of amplitude values sensed by sensors 590. In one embodiment, the computer 505 passively receives sensor telemetry readings actively transmitted by sensors 590. In one embodiment, the computer 505 receives one or more collections, sets, or databases of sensor telemetry readings previously collected from sensors 590, for example from storage 535 or from remote computers 565.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A computer-implemented method, comprising:

separating a plurality of time series signals from individual sources into a plurality of alternative configurations of clusters based on correlations between the time series signals, wherein the alternative configurations of clusters differ by amount of individual clusters that the time series signals are separated into;

training machine learning models for the individual clusters in the alternative configurations of clusters;

determining whether one or more of the alternative configurations of clusters is viable for use in a production environment based on whether the trained machine learning models for the individual clusters in the one or more of the alternative configurations of clusters satisfy an accuracy threshold and a completion time threshold;

selecting one configuration of clusters from the alternative configurations of clusters that were determined to be viable configurations;

deploying production machine learning models into the production environment to detect anomalies in the time series signals based on the selected one configuration of clusters;

monitoring the selected configuration of clusters for the anomalies with the production machine learning models; and in response to detecting a particular anomaly in the time series signals with the production machine learning models, generating an electronic alert that the particular anomaly has occurred.

2. The computer-implemented method of claim 1, wherein separating the plurality of time series signals into a plurality of alternative configurations of clusters based on correlations between the time series signals further comprises iteratively executing a clustering algorithm to separate the time series signals into specified amounts of individual clusters.

3. The computer-implemented method of claim 1, further comprising:

receiving a configuration of hardware in the production environment; and in response to the trained machine learning models for the individual clusters in one of the alternative configurations of clusters satisfying the accuracy threshold:

simulating execution by the hardware in the configuration of hardware of one of the trained machine learning models that is trained for a largest cluster that is in the one of the alternative configurations of clusters, determining a completion time for the one of the alternative configurations of clusters based on the simulated execution, and comparing the completion time to the completion time threshold to determine whether the trained machine learning models for the individual clusters that are in the one of the alternative configurations of clusters satisfy the completion time threshold.

4. The computer-implemented method of claim 1, further comprising:

executing the trained machine learning models for the individual clusters in one of the alternative configurations of clusters to determine accuracy levels of the trained machine learning models for the individual clusters that are in the one of the alternative configurations; and comparing the accuracy levels against the accuracy threshold to determine whether the trained machine learning models for the individual clusters that are in the one of the alternative configurations of clusters satisfy the accuracy threshold.

5. The computer-implemented method of claim 1, wherein the trained machine learning models for the individual clusters in the one or more of the alternative configurations of clusters are initially evaluated against the accuracy threshold, and a subset of the trained machine learning models for the individual clusters in the one or more of the alternative configurations of clusters that have satisfied the accuracy threshold is subsequently evaluated against the completion time threshold.

6. The computer-implemented method of claim 1, wherein the completion time threshold is determined to be satisfied based on (i) a training time taken to train one of the machine learning models, or (ii) a monitoring time taken to generate estimates of what signal values should be by one of the trained machine learning models.

7. The computer-implemented method of claim 1, wherein selecting one configuration of clusters from the alternative configurations of clusters that were determined to be viable further comprises automatically selecting the one configuration of clusters based on accuracy levels of the trained machine learning models that were trained for the individual clusters in the one configuration of clusters.

8. A non-transitory computer-readable medium that includes stored thereon computer-executable instructions that when executed by at least one processor of a computer cause the computer to:

separate a plurality of time series signals received from a corresponding plurality of sensors into a plurality of alternative configurations of clusters based on correlations between the time series signals, wherein, in each of the alternative configurations of clusters, the plurality of time series signals is divided into a respective number of clusters of intercorrelated signals that differs from respective numbers of clusters of the other alternative configurations of clusters, and wherein each of the alternative configurations of clusters is one option under evaluation for deployment;

train machine learning models for individual clusters in the alternative configurations of clusters;

determine whether one or more of the alternative configurations of clusters is viable for use in a production environment based on whether the trained machine learning models for the individual clusters in the one or more of the alternative configurations of clusters satisfy an accuracy threshold and a completion time threshold;

select one configuration of clusters from the alternative configurations of clusters that were determined to be viable configurations; and deploy production machine learning models into the production environment to detect anomalies in the time series signals based on the selected one configuration of clusters.

9. The non-transitory computer-readable medium of claim 8, wherein the computer-executable instructions for separating the plurality of time series signals into a plurality of alternative configurations of clusters based on correlations between the time series signals further cause the computer to:

specify the amounts of individual clusters to include in the alternative configurations of clusters;

iteratively execute a clustering algorithm to separate the time series signals into the specified amounts of individual clusters to produce the plurality of alternative configurations of clusters.

10. The non-transitory computer-readable medium of claim 8, wherein the comptuer-executable instructions further cause the computer to:

execute the trained machine learning models for the individual clusters to determine accuracy levels of the trained machine learning models;

retain the alternative configurations of clusters for which the trained machine learning models have accuracy levels that satisfy the accuracy threshold;

simulate execution in a target environment of the trained machine learning models for the retained alternative configurations of clusters to determine completion times for the retained alternative configurations of clusters; and determine the retained alternative configurations of clusters for which the completion times satisfy the completion time threshold to be viable for deployment to the target environment.

11. The non-transitory computer-readable medium of claim 8, wherein the completion time threshold is determined to be satisfied based on a training time taken to train one of the machine learning models.

12. The non-transitory computer-readable medium of claim 8, wherein the computer-executable instructions further cause the computer to:

configure the production machine learning models to be executed in parallel;

monitor the selected configuration of clusters for anomalies with the production machine learning models, wherein the clusters in the selected configuration of clusters are monitored in parallel by the production machine learning models; and in response to detecting a particular anomaly in the time series signals with the production machine learning models, generate an electronic alert that the particular anomaly has occurred.

13. The non-transitory computer-readable medium of claim 8, wherein the computer-executable instructions for selecting one configuration of clusters from the alternative configurations of clusters that were determined to be viable further cause the computer to:

generate a user interface that displays the alternative configurations of clusters that were determined to be viable; and accept a user input through the user interface that selects the one configuration of clusters.

14. A computing system, comprising:

at least one processor;

at least one memory connected to the at least one processor;

a non-transitory computer readable medium including instructions stored thereon that when executed by the at least one processor cause the computing system to:

separate a plurality of time series signals received from a corresponding plurality of sensors into a plurality of alternative configurations of clusters based on correlations between the time series signals, wherein, in each of the alternative configurations of clusters, the plurality of time series signals is divided into a respective number of clusters of intercorrelated signals that differs from respective numbers of clusters of the other alternative configurations of clusters, and wherein each of the alternative configurations of clusters is one option under evaluation for deployment;

train machine learning models for individual clusters in the alternative configurations of clusters;

determine whether one or more of the alternative configurations of clusters is viable for use in a target environment based on whether the trained machine learning models for the individual clusters in the one or more of the alternative configurations of clusters satisfy an accuracy threshold and a completion time threshold;

select one configuration of clusters from the alternative configurations of clusters that were determined to be viable configurations; and deploy production machine learning models into the target environment to detect anomalies in the time series signals based on the selected configuration of clusters.

15. The computing system of claim 14, wherein the instructions for separating the plurality of time series signals into a plurality of alternative configurations of clusters based on correlations between the time series signals further cause the computing system to iteratively execute a clustering algorithm to separate the time series signals into different amounts of individual clusters.

16. The computing system of claim 14, wherein the instructions further cause the computing system to:

execute the trained machine learning models for the individual clusters to determine accuracy levels of the trained machine learning models;

retain the alternative configurations of clusters for which the trained machine learning models have accuracy levels that satisfy the accuracy threshold;

simulate execution in a target environment of the trained machine learning models for the retained alternative configurations of clusters to determine completion times for the retained alternative configurations of clusters; and determine the retained alternative configurations of clusters for which the completion times satisfy the completion time threshold to be viable for deployment to the target environment.

17. The computing system of claim 14, wherein the completion time threshold is determined to be satisfied based on a monitoring time taken to generate an estimate of what signal values should be by one of the trained machine learning models.

18. The computing system of claim 14, wherein the instructions further cause the computing system to:

monitor the selected configuration of clusters for anomalies with the production machine learning models; and in response to detecting a particular anomaly in the time series signals with the production machine learning models, generate an electronic alert that the particular anomaly has occurred.

19. The computing system of claim 14, wherein the instructions for selecting one configuration of clusters from the alternative configurations of clusters that were determined to be viable further cause the computing system to automatically select the one configuration of clusters based on compute times of the trained machine learning models that were trained for the individual clusters in the one configuration of clusters.

* * * * *